US010183569B2

(12) United States Patent
Toyota et al.

(10) Patent No.: US 10,183,569 B2
(45) Date of Patent: Jan. 22, 2019

(54) POWER GENERATION CONTROL DEVICE FOR HYBRID VEHICLE

(71) Applicant: Nissan Motor Co., Ltd., Yokohama-shi, Kanagawa (JP)

(72) Inventors: Ryohey Toyota, Kanagawa (JP); Masato Koga, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/579,654

(22) PCT Filed: Jun. 24, 2015

(86) PCT No.: PCT/JP2015/068188
§ 371 (c)(1),
(2) Date: Dec. 5, 2017

(87) PCT Pub. No.: WO2016/208003
PCT Pub. Date: Dec. 29, 2016

(65) Prior Publication Data
US 2018/0147931 A1   May 31, 2018

(51) Int. Cl.
*B60K 6/26* (2007.10)
*B60K 6/36* (2007.10)
(Continued)

(52) U.S. Cl.
CPC ............... *B60K 6/442* (2013.01); *B60K 6/36* (2013.01); *B60K 6/547* (2013.01); *B60W 10/06* (2013.01);
(Continued)

(58) Field of Classification Search
CPC .......... B60K 6/442; B60K 6/36; B60K 6/547; B60K 2006/268; B60W 10/11;
(Continued)

(56) References Cited

U.S. PATENT DOCUMENTS 8,417,408 B2 * 4/2013 Wakashiro ............ B60W 10/02
180/65.21
9,566,978 B2 * 2/2017 Yang ...................... B60K 6/387
(Continued)

FOREIGN PATENT DOCUMENTS

JP     3013694 B2      12/1999
JP     2004-104900 A    4/2004
(Continued)

*Primary Examiner* — Thomas Ingram
(74) *Attorney, Agent, or Firm* — Global IP Counselors, LLP

(57) ABSTRACT

A power generation control device is provided for a hybrid vehicle that prevents discomfort to an occupant in a traveling scenario in which stops and starts are repeated. The power generation control device includes a power generation controller that selectively carries out series power generation and idle power generation. In series power generation, a first motor/generator is used as the drive source and electric power is generated in a second motor/generator by an internal combustion engine. In idle power generation, electric power is generated in the second motor/generator by the internal combustion engine while the vehicle is stopped. The power generation controller sets a series power generation start threshold of the battery at which series power generation is started, and an idle power generation start threshold of the battery at which idle power generation is started. The series and idle power generation start thresholds are the same value.

7 Claims, 12 Drawing Sheets

(51) Int. Cl.

| | | |
|---|---|---|
| *B60K 6/442* | (2007.10) | |
| *B60K 6/547* | (2007.10) | |
| *B60W 10/06* | (2006.01) | |
| *B60W 10/08* | (2006.01) | |
| *B60W 10/11* | (2012.01) | |
| *B60W 10/26* | (2006.01) | |
| *B60W 20/17* | (2016.01) | |
| *B60W 20/20* | (2016.01) | |
| *B60W 30/20* | (2006.01) | |

(52) U.S. Cl.
CPC ............ *B60W 10/08* (2013.01); *B60W 10/11* (2013.01); *B60W 10/26* (2013.01); *B60W 20/20* (2013.01); *B60K 2006/268* (2013.01); *B60W 20/17* (2016.01); *B60W 2030/206* (2013.01); *B60W 2510/1005* (2013.01); *B60W 2510/244* (2013.01); *B60W 2520/10* (2013.01); *B60W 2540/10* (2013.01); *B60W 2710/06* (2013.01); *B60W 2710/08* (2013.01); *B60W 2710/244* (2013.01); *B60Y 2200/92* (2013.01); *B60Y 2300/43* (2013.01); *B60Y 2300/60* (2013.01); *B60Y 2300/91* (2013.01); *Y02T 10/6234* (2013.01); *Y02T 10/6286* (2013.01); *Y02T 10/7077* (2013.01); *Y10S 903/919* (2013.01); *Y10S 903/93* (2013.01)

(58) Field of Classification Search
CPC ...... B60W 20/20; B60W 10/26; B60W 10/08; B60W 10/06; B60W 2030/206; B60W 2510/244; B60W 20/17; B60W 2540/10; B60W 2520/10; B60W 2710/244; B60W 210/08; B60W 2710/06; B60W 2510/1005; Y10S 903/93; Y10S 903/919; Y02T 10/6286; Y02T 10/6234; Y02T 10/7077; B60Y 2300/43; B60Y 2300/60; B60Y 2300/91

See application file for complete search history.

(56) References Cited

U.S. PATENT DOCUMENTS

2009/0171523 A1\* 7/2009 Luo ...................... B60W 20/40
701/22
2014/0229043 A1   8/2014 Frank et al.

FOREIGN PATENT DOCUMENTS

| JP | 2005-348482 A | 12/2005 |
| JP | 2006-125218 A | 5/2006 |
| JP | 2009-18719 A | 1/2009 |
| JP | 2011-11714 A | 1/2011 |

\* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st / ICE 1st | EV 1st / ICE – | EV 1st / ICE 3rd |
| Left | Left | Lock | EV 1st / ICE 2nd | Lock |
| Left | N | EV 1.5 / ICE 2nd | EV – / ICE 2nd | Lock |
| N | Right | Lock | EV 2nd / ICE 2nd | Lock |
| N | Right | EV 2nd / ICE 3rd' | EV 2nd / ICE – | EV 2nd / ICE 3rd |
| Right | Right | Lock | EV 2nd / ICE 4th | Lock |
| Right | N | EV 2.5 / ICE 4th | EV – / ICE 4th | Lock |
| Right | Left | Lock | EV 1st / ICE 4th | Lock |

 : NORMAL USE GEAR SHIFT PATTERN

 : GEAR SHIFT PATTERN USED AT LOW SOC, ETC.

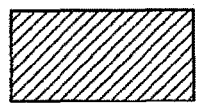 : GEAR SHIFT PATTERN THAT CANNOT BE SELECTED BY SHIFT MECHANISM

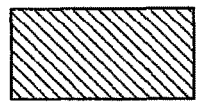 : GEAR SHIFT PATTERN NOT NORMALLY USED

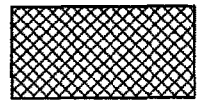 : GEAR SHIFT PATTERN THAT CANNOT BE SELECTED BY INTERLOCK

FIG. 4

POWER GENERATION CONTROL DEVICE FOR HYBRID VEHICLE

This application is a U.S. National stage application of International Application No. PCT/JP2015/068188, filed Jun. 24, 2015.

BACKGROUND

Field of the Invention

The present invention relates to a power generation control device for a hybrid vehicle that carries out series power generation during traveling and idle power generation while the vehicle is stopped.

Background Information

Conventionally, a power generation control device is known, which increases the battery SOC threshold, which is a threshold value for starting charging, in the case of a driving state in which the traveling sound is loud. That is, a hybrid vehicle, which starts the engine with a decreased battery SOC to charge the battery with a generator, is configured to have two threshold values: a battery SOC threshold for starting the engine while the vehicle is stopped, and a battery SOC threshold during traveling. The object is to thereby reduce discontent of the occupant with respect to noise (for example, see Japanese Patent No. 3013694 which is refer to as Patent Document 1).

SUMMARY

However, the conventional device has two threshold values: a battery SOC threshold while the vehicle is stopped and a battery SOC threshold during traveling. Consequently, there is the problem that, if stopping and starting of the vehicle is repeated, control hunting occurs in which the engine repeats starting and stopping, which increases changes in the engine sound, and imparts discomfort to the occupant.

In view of the problems described above, an object of the present invention is to provide a power generation control device for a hybrid vehicle that prevents discomfort from being imparted to the occupant in a traveling scenario in which stops and starts are repeated.

In order to achieve the object described above, the hybrid vehicle of the present invention comprises a first electric motor that is mechanically coupled to a drive wheel and that is primarily used for travel driving, a second electric motor that is mechanically coupled to an internal combustion engine, and a battery that is electrically coupled to the first electric motor and the second electric motor. This hybrid vehicle is provided with a power generation controller that carries out series power generation, in which electric power is generated by the second electric motor by receiving driving force from the internal combustion engine while traveling by using the first electric motor as the drive source, and idle power generation in which electric power is generated by at least one of the first electric motor and the second electric motor by receiving driving force from the internal combustion engine while the vehicle is stopped. The power generation controller makes a series power generation start threshold of the charge capacity of the battery at which series power generation is started and an idle power generation start threshold of the charge capacity of the battery at which idle power generation is started to the same value. The same value is a value that maintains a charge capacity of the battery within a range in which it is not necessary to limit the output of the first electric motor during traveling.

Therefore, the series power generation start threshold of the charge capacity of the battery at which series power generation is started and the idle power generation start threshold of the charge capacity of the battery at which idle power generation is started are set to the same value by the power generation controller. That is, by setting the series power generation start threshold and the idle power generation start threshold to the same value, the stopping and starting of the internal combustion engine is not repeated in a traveling scenario in which stops and starts are repeated, such as when traveling in extremely heavy traffic. As a result, it is possible to prevent discomfort from being imparted to the occupant in a traveling scenario in which stops and starts are repeated.

BRIEF DESCRIPTION OF THE DRAWINGS

Referring now to the drawings, a power generation control device is illustrated for a hybrid vehicle.

FIG. 4 is an engagement table illustrating the gear shift patterns according to the switching positions of three engagement clutches in a multistage gear transmission mounted in a hybrid vehicle to which the power generation control device of the first embodiment is applied.

DETAILED DESCRIPTION OF THE EMBODIMENTS

Figure 1:
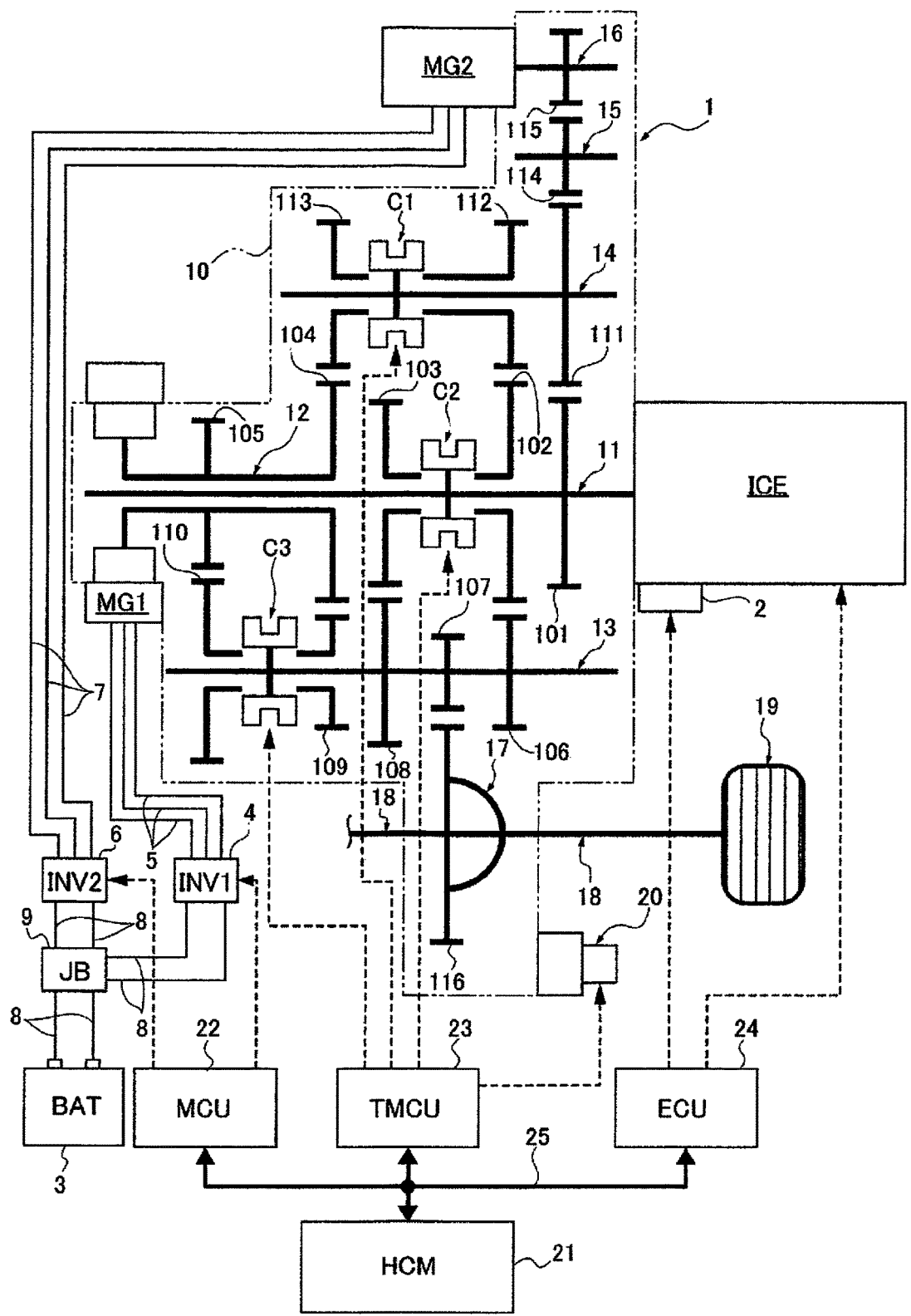
FIG. 1 is an overall system diagram illustrating a drive system and a control system of a hybrid vehicle to which the power generation control device of the first embodiment is applied.

A preferred embodiment for realizing the power generation control device for a hybrid vehicle according to the present invention is described below, based on first and second embodiments illustrated in the drawings.

First Embodiment

The configuration is described first. The power generation control device of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the shift control system," the "configuration of the gear shift stages," and the "configuration of the power generation control process" will be described below separately, regarding the configuration of the power generation control device for a hybrid vehicle in the first embodiment.

Overall System Configuration

FIG. 1 illustrates a drive system and a control system of a hybrid vehicle to which the power generation control device of the first embodiment is applied. The overall system configuration will be described below, based on FIG. 1.

The drive system of the hybrid vehicle comprises an internal combustion engine ICE, a first motor/generator MG1, a second motor/generator MG2, and a multistage gear transmission 1 (power split mechanism) having three engagement clutches C1, C2, C2, as illustrated in FIG. 1. "ICE" is an acronym for "Internal Combustion Engine."

The internal combustion engine ICE is, for example, a gasoline engine or a diesel engine disposed in a front compartment of a vehicle, such that the crankshaft direction is in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, in which the second motor/generator MG2 is used as a starter motor. However, a starter motor 2 is left in preparation for when an MG2 start using a high-power battery 3 cannot be ensured, such as during extreme cold.

Both the first motor/generator MG1 and the second motor/generator MG2 are permanent magnet type synchronous motors utilizing a three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is connected to the internal combustion engine ICE, and a first gear 101, a second gear 102, and a third gear 103 are disposed on the first shaft 11, in order from the right side in FIG. 1. The first gear 101 is integrally provided (including integral fixing) on the first shaft 11. The second gear 102 and the third gear 103 are idling gears, in which boss portions protruding in the axial direction are inserted onto the outer perimeter of the first shaft 11, and are provided so as to be drivably connectable to the first shaft 11 via the second engagement clutch C2.

The second shaft 12 is connected to the first motor/generator MG1, and is a cylindrical shaft coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) to the second shaft 12.

The third shaft 13 is disposed on the output side of the multistage gear transmission 1, with a sixth gear 106, a seventh gear 107, an eighth gear 108, a ninth gear 109, and a tenth gear 110 disposed on the third shaft 13, in order from the right side in FIG. 1. The sixth gear 106, the seventh gear 107, and the eighth gear 108 are integrally provided (including integral fixing) on the third shaft 13. The ninth gear 109 and the tenth gear 110 are idling gears, in which boss portions protruding in the axial direction are inserted onto the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends supported on the transmission case 10, with an eleventh gear 111, a twelfth gear 112, and a thirteenth gear 113 disposed on the fourth shaft 14, in order from the right side in FIG. 1. The eleventh gear 111 is integrally provided (including integral fixing) on the fourth shaft 14. The twelfth gear 112 and the thirteenth gear 113 are idling gears, in which boss portions protruding in the axial direction are inserted onto the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends supported on the transmission case 10, and a fourteenth gear 114 that meshes with the eleventh gear 111 of the fourth shaft 14 is integrally provided thereto (including integral fixing).

The sixth shaft 16 is connected to the second motor/generator MG2, and a fifteenth gear 115 that meshes with the fourteenth gear 114 of the fifth shaft 15 is integrally provided thereto (including integral fixing).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement stroke in a rotationally synchronized state, by not having a synchronizing mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and is engaged by an engagement stroke in a rotationally synchronized state, by not having a synchronizing mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is interposed between the ninth gear 109 and the tenth gear 110 of the third shaft 13, and is engaged by an engagement stroke in a rotationally synchronized state, by not having a synchronizing mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) with the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means to appropriately manage the energy consumption of the entire vehicle. This hybrid control module 21 and the other control units (motor control unit 22, transmission control unit 23, engine control unit 24, etc.) are connected by a CAN communication line 25 so as to be capable of bidirectional information exchange. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target torque is determined. In the "rotational speed FB control," a control is carried out in which a target motor rotation speed, with which the input/output rotational speeds of the clutch are synchronized, is determined, and an FB torque is output so as to converge the actual motor rotation speed to the target motor rotation speed, when there is a gear shift request to mesh and engage any one of the engagement clutches C1, C2, C3 during traveling.

The transmission control unit 23 (acronym: "TMCU") carries out a shift control for switching the gear shift stage of the multistage gear transmission 1, by outputting a current command to electric actuators 31, 32, 33 (refer to FIG. 2), based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotation speed between the input/output of the clutch to ensure meshing and engaging, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the first embodiment is characterized in that efficiency is achieved by reducing drag by employing, as shifting elements, engagement clutches C1, C2, C3 (dog clutch) that are meshed and engaged. Then, when there is a gear shift request to mesh and engage any one of the engagement clutches C1, C2, C3, the differential rotation speeds of the input/output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes equal to or less than a release torque determination value, to realize the gear shift. The configuration of the shift control system of the multistage gear transmission 1 is described below based on FIG. 2.

Figure 2:
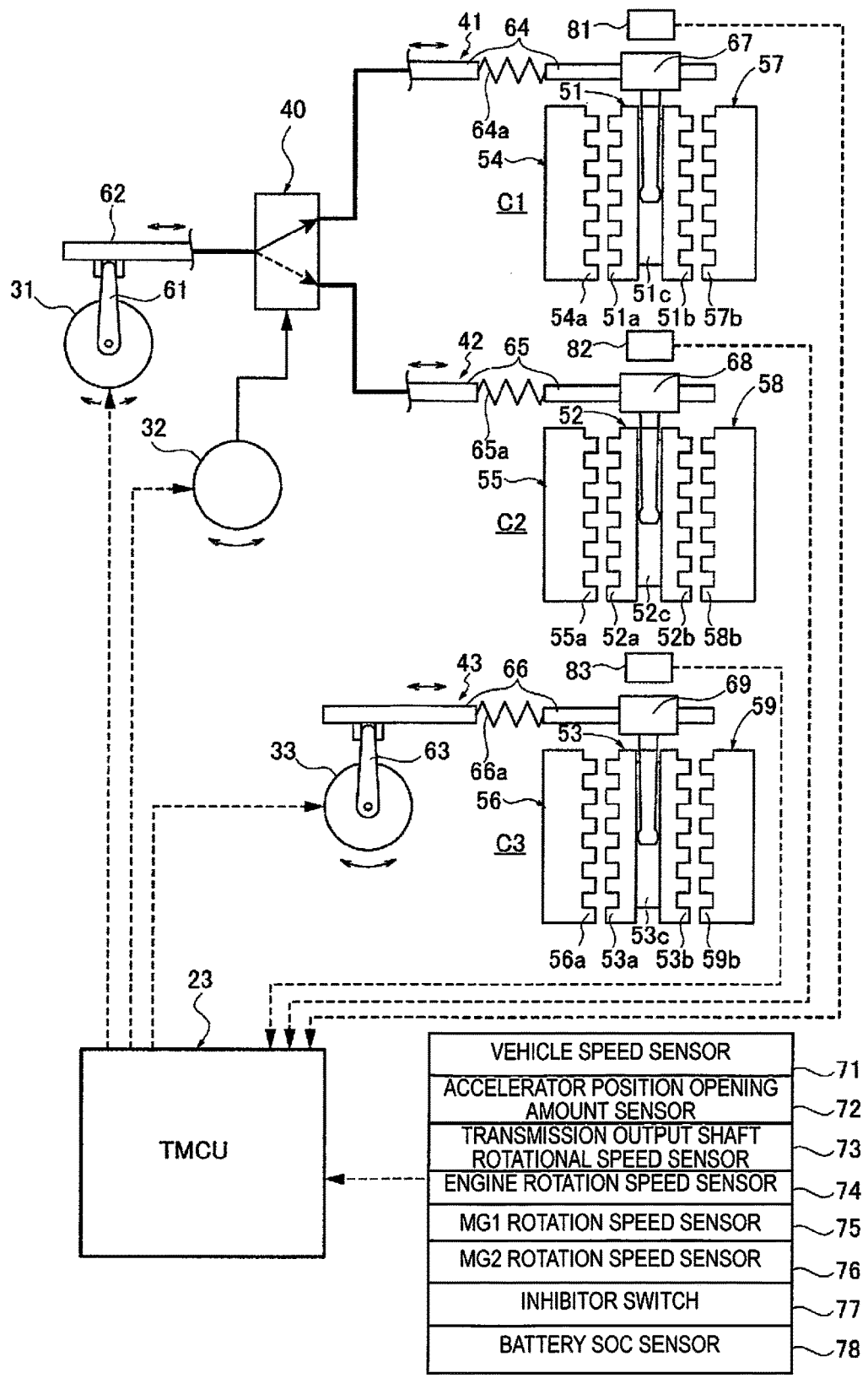
FIG. 2 is a control system block diagram illustrating the configuration of a shift control system of a multistage gear transmission mounted in a hybrid vehicle to which the power generation control device of the first embodiment is applied.

The shift control system comprises, as engagement clutches, a first engagement clutch C1, a second engagement clutch C2, and a third engagement clutch C3, as illustrated in FIG. 2. A first electric actuator 31 for C1, C2 shift operation, a second electric actuator 32 for C1, C2 select operation, and a third electric actuator 33 for C3 shift operation are provided as actuators. A C1/C2 select operation mechanism 40, a C1 shift operation mechanism 41, a C2 shift operation mechanism 42, and a C3 shift operation mechanism 43 are provided as shift mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b; 52a, 52b; 53a, 53b on both sides having flat top faces. Furthermore, fork grooves 51c, 52c, 53c are provided to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top faces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top faces that oppose the dog teeth 51b, 52b, 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42. When selecting the first position, a shift rod 62 and a shift rod 64 of the first engagement clutch C1 are connected, and a shift rod 65 of the second engagement clutch C2 is locked in the neutral position. When selecting the second position, the shift rod 62 and the shift rod 65 of the second engagement clutch C2 are connected, and the shift rod 64 of the first engagement clutch C1 is locked in the neutral position. That is, the mechanism is such that, when selecting a position from among the first position and the second position where one of the engagement clutches is shifted, the other engagement clutch is locked and fixed in the neutral position.

The C1 shift operation mechanism 41, the C2 shift operation mechanism 42, and the C3 shift operation mechanism 43 convert the turning motions of the electric actuators 31, 33 into axial stroke motions of the coupling sleeves 51, 52, 53. The shift operating mechanisms 41, 42, 43 all have the same configuration, comprising turning links 61, 63, shift rods 62, 64, 65, 66, and shift forks 67, 68, 69. One end of each of the turning links 61, 63 is provided on the actuator shafts of the electric actuators 31, 33, with the other ends connected to one of the shift rods 64 (or shift rod 65), 66 so as to be relatively displaceable. The shift rods 64, 65, 66 are configured to be capable of expanding and contracting according to the magnitude and the direction of the rod transmitting force, by having springs 64a, 65a, 66a interposed in the rod dividing positions. One end of each of the shift forks 67, 68, 69 is fixed to one of the shift rods 64, 65, 66, and the other end is disposed in one of the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, and the like. The transmission output shaft rotational speed sensor 73 is provided on the shaft end portion of the third shaft 13 and detects the shaft rotation speed of the third shaft 13. Then, a position servo control unit (for example a position servo system by PID control) is provided, which controls mesh engagement and disengagement of the engagement clutches C1, C2, C3, determined by the positions of the coupling sleeves 51, 52, 53. This position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacing the coupling sleeves 51, 52, 53 in the axial direction, the idling gears are disconnected from the fourth shaft 14, the first shaft 11, and the third shaft 13.

Configuration of the Gear Shift Stages

The multistage gear transmission 1 of the first embodiment is characterized in that size reduction is achieved by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift stages of the multistage gear transmission 1 is described below based on FIG. 3 and FIG. 4.

Figure 3:
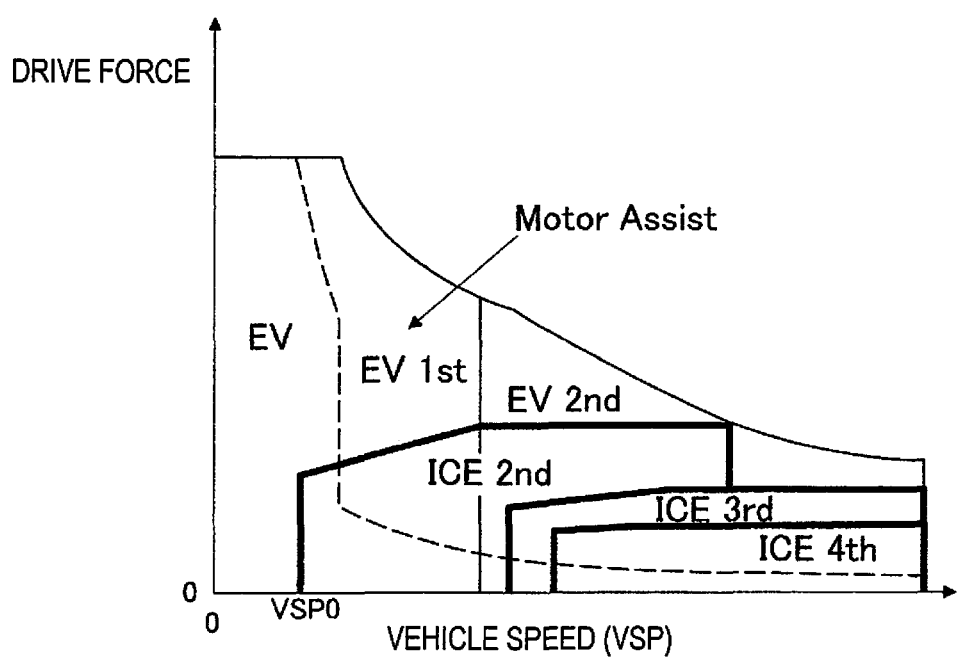
FIG. 3 is a schematic overview of a shifting map illustrating a concept of switching the gear shift pattern in a multistage gear transmission mounted in a hybrid vehicle to which the power generation control device of the first embodiment is applied.

A concept of the gear shift stages is employed in which, when the vehicle speed VSP is in a starting region equal to or less than a predetermined vehicle speed VSP0, since the multistage gear transmission 1 does not have a starting element (slipping element), a motor start (EV start) by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st)→ICE 2nd→ICE 3rd→ICE 4th, and the EV gear shift stages shift from EV 1st→EV 2nd. Therefore, based on the concept of the gear shift stages illustrated in FIG. 3, a shifting map for issuing gear shift requests for switching the gear shift stage is created.

All of the gear shift patterns obtainable by the multistage gear transmission 1 having engagement clutches C1, C2, C3 are as shown in FIG. 4. In FIG. 4, "Lock" represents an interlock gear shift stage that is not applicable as a gear shift stage, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift stages is described below.

When the second engagement clutch C2 is "N" and the third engagement clutch C3 is "N," the following gear shift patterns are obtained according to the position of the first engagement clutch C1. "EV-ICEgen" is obtained if the first engagement clutch C1 is "Left," "Neutral" is obtained if the first engagement clutch C1 is "N," and "EV-ICE 3rd" is obtained if the first engagement clutch C1 is "Right." Here, the gear shift pattern "EV-ICEgen" is a gear shift pattern selected at the time of MG1 idle power generation, in which power is generated in the first motor/generator MG1 by the internal combustion engine ICE when the vehicle is stopped, or, at the time of double idle power generation in which MG2 power generation is carried out in addition to MG1 power generation. The gear shift stage "Neutral" is a gear shift stage selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift patterns are obtained according to the position of the first engagement clutch C1. "EV 1st ICE 1st" is obtained if the first engagement clutch C1 is "Left," "EV 1st ICE-" is obtained if the first engagement clutch C1 is "N," and "EV 1st ICE 3rd" is obtained if the first engagement clutch C1 is "Right." Here, the gear shift pattern "EV 1st ICE-" is a gear shift pattern selected when in the "EV mode" in which the internal combustion engine ICE is stopped and traveling is carried out by the first motor/generator MG1, or, in the "series HEV mode" in which a first-speed EV traveling is carried out by the first motor/generator MG1 while power is generated in the second motor/generator MG2 by the internal combustion engine ICE. In addition, the gear shift pattern "EV 1st ICE-" is a gear shift pattern selected at the time of MG2 idle power generation, in which power is generated in the second motor/generator MG2 by the internal combustion engine ICE when the vehicle is stopped, and the first motor/generator MG1 is kept mechanically coupled to the drive wheels 19.

When the second engagement clutch C2 is "Left" and the third engagement clutch C3 is "Left," "EV 1st ICE 2nd" is obtained if the position of the first engagement clutch C1 is "N." When the second engagement clutch C2 is "Left" and the third engagement clutch C3 is "N," the following gear shift patterns are obtained according to the position of the first engagement clutch C1. "EV 1.5 ICE 2nd" is obtained if the first engagement clutch C1 is "Left," and "EV-ICE 2nd" is obtained if the first engagement clutch C1 is "N." When the second engagement clutch C2 is "Left" and the third engagement clutch C3 is "Right," "EV 2nd ICE 2nd" is obtained if the position of the first engagement clutch C1 is "N."

When the second engagement clutch C2 is "N" and the third engagement clutch C3 is "Right," the following gear shift patterns are obtained according to the position of the first engagement clutch C1. "EV 2nd ICE 3rd" is obtained if the first engagement clutch C1 is "Left," "EV 2nd ICE-" is obtained if the first engagement clutch C1 is "N," and "EV 2nd ICE 3rd" is obtained if the first engagement clutch C1 is "Right." Here, the gear shift pattern "EV 2nd ICE-" is a gear shift pattern selected when in the "EV mode" in which the internal combustion engine ICE is stopped and traveling is carried out by the first motor/generator MG1, or, in the "series HEV mode" in which a second-speed EV traveling is carried out by the first motor/generator MG1 while power is generated in the second motor/generator MG2 by the internal combustion engine ICE.

When the second engagement clutch C2 is "Right" and the third engagement clutch C3 is "Right," "EV 2nd ICE 4th" is obtained if the position of the first engagement clutch C1 is "N." When the second engagement clutch C2 is "Right" and the third engagement clutch C3 is "N," the following gear shift patterns are obtained according to the position of the first engagement clutch C1. "EV 2.5 ICE 4th" is obtained if the first engagement clutch C1 is "Left," and "EV-ICE 4th" is obtained if the first engagement clutch C1 is "N." When the second engagement clutch C2 is "Right" and the third engagement clutch C3 is "Left," "EV 1st ICE 4th" is obtained if the position of the first engagement clutch C1 is "N."

Described next is a method to separate the "normal use gear shift pattern" from all the above-described gear shift patterns achieved by engagement combinations of the engagement clutches C1, C2, C3. First, gear shift patterns excluding the "interlock gear shift patterns (cross hatching in FIG. 4)" and "gear shift patterns that cannot be selected by the shift mechanism (right up hatching in FIG. 4)" from all the gear shift patterns shall be the plurality of gear shift patterns that can be achieved by the multistage gear transmission 1. Here, gear shift patterns that cannot be selected by the shift mechanism refers to "EV 1.5 ICE 2nd" in which the first engagement clutch C1 is "Left" and the second engagement clutch C2 is "Left," and "EV 2.5 ICE 4th" in which the first engagement clutch C1 is "Left" and the second engagement clutch C2 is "Right." The reason these gear shift patterns cannot be selected by the shift mechanism is that one first electric actuator 31 is a shift actuator that is shared for use with two engagement clutches C1, C2, and that one of the engagement clutches is neutral locked by the C1/C2 select operation mechanism 40.

Then, gear shift patterns excluding the "gear shift patterns not normally used (right down hatching in FIG. 4)" and "gear shift patterns used with low SOC, etc. (dashed line frame in FIG. 4)" from the plurality of gear shift patterns that can be achieved by the multistage gear transmission 1 shall be the "normal use gear shift pattern (thick line frame in FIG. 4)." Here, the "gear shift patterns not normally used" are "EV 2nd ICE 3rd" and "EV 1st ICE 4th," and the "gear shift patterns used with low SOC, etc." are "EV-ICE gen" and "EV 1st ICE 1st."

Therefore, "normal use gear shift patterns" are configured by adding "Neutral" to EV gear shift patterns (EV 1st, ICE-, EV 2nd ICE-), ICE gear shift patterns (EV-ICE 2nd, EV-ICE 3rd, EV-ICE 4th), and combination gear shift patterns (EV 1st ICE 2nd, EV 1st ICE 3rd, EV 2nd ICE 2nd, EV 2nd ICE 3rd, EV 2nd ICE 4th).

Next, based on the concept of the gear shift patterns illustrated in FIG. 3, three schedule maps, that is, first schedule map map1 to third schedule map map3, are set for issuing gear shift requests for switching the gear shift pattern.

Figure 9:
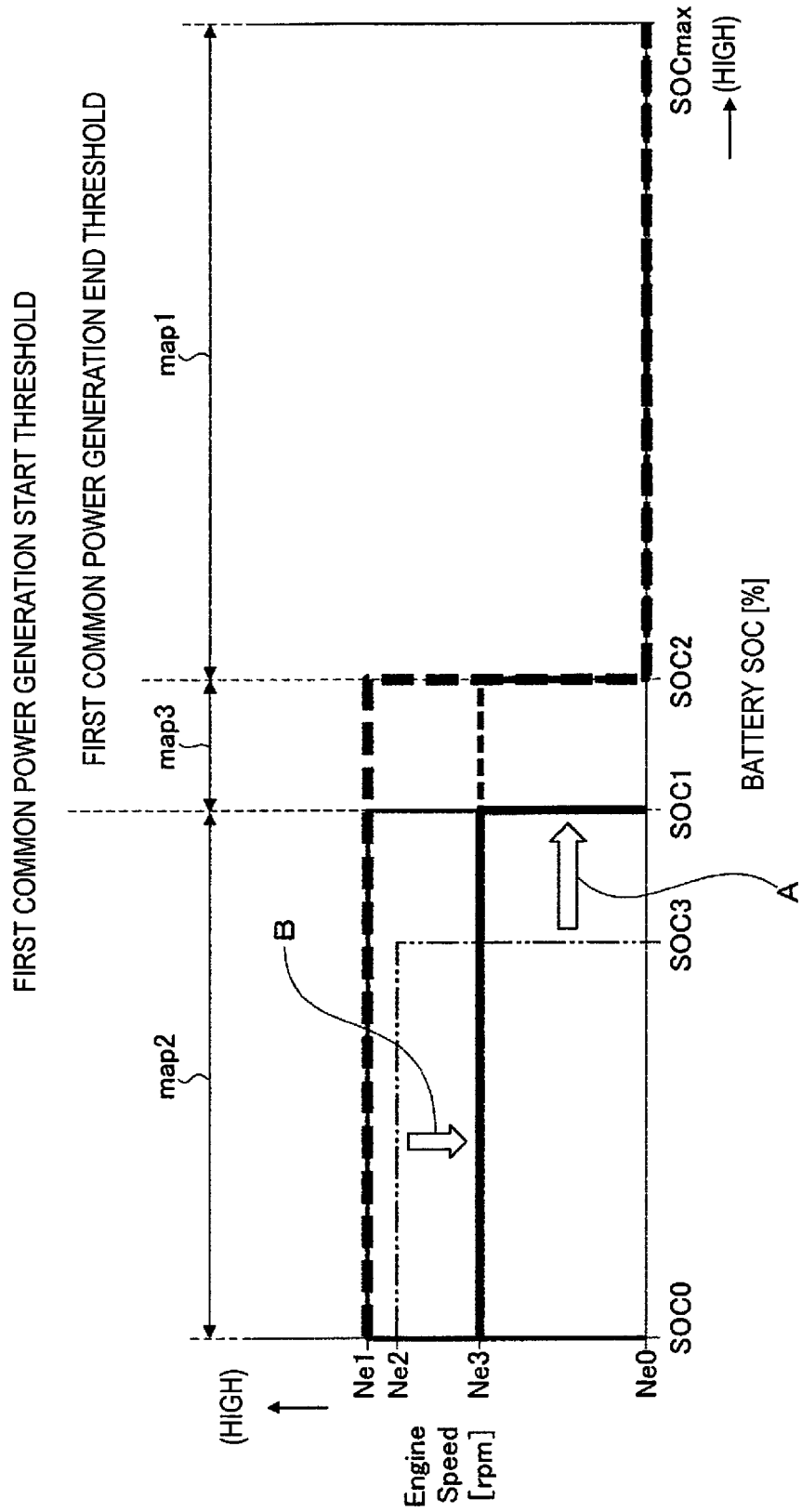
FIG. 9 is a diagram illustrating a case in which the power generation start threshold of the first embodiment is aligned with a first common power generation start threshold, and is an energy management map illustrating the battery SOC and the engine rotation speed in the first embodiment.

FIG. 9, explained in greater detail below, shows an energy management (energy management) map illustrating the battery SOC and the engine rotation speed of the first embodiment. As illustrated in this energy management map, the regions for using the first schedule map map1 to third schedule map map3 are set according to the battery SOC. That is, the first schedule map map1 is used in a middle to high SOC region (region shown as map1 in the figure), in which the battery SOC is from a predetermined value SOC2 (power generation end threshold, first common power generation end threshold) to an upper limit value SOCmax. In addition, the second schedule map map2 is used in a low to middle SOC region (region shown as map2 in the figure), in which the battery SOC is from a predetermined value SOC0, which is zero, to the predetermined value SOC1 (power generation start threshold, first common power generation start threshold). Furthermore, the third schedule map map3 is used in a middle SOC region (region shown as map3 in the figure), in which the battery SOC is from the predetermined value SOC1 to the predetermined value SOC2. Specific configuration examples of the above-described first schedule map map1 to third schedule map map3 will be described below, based on FIG. 5-FIG. 7, respectively.

Figure 5:
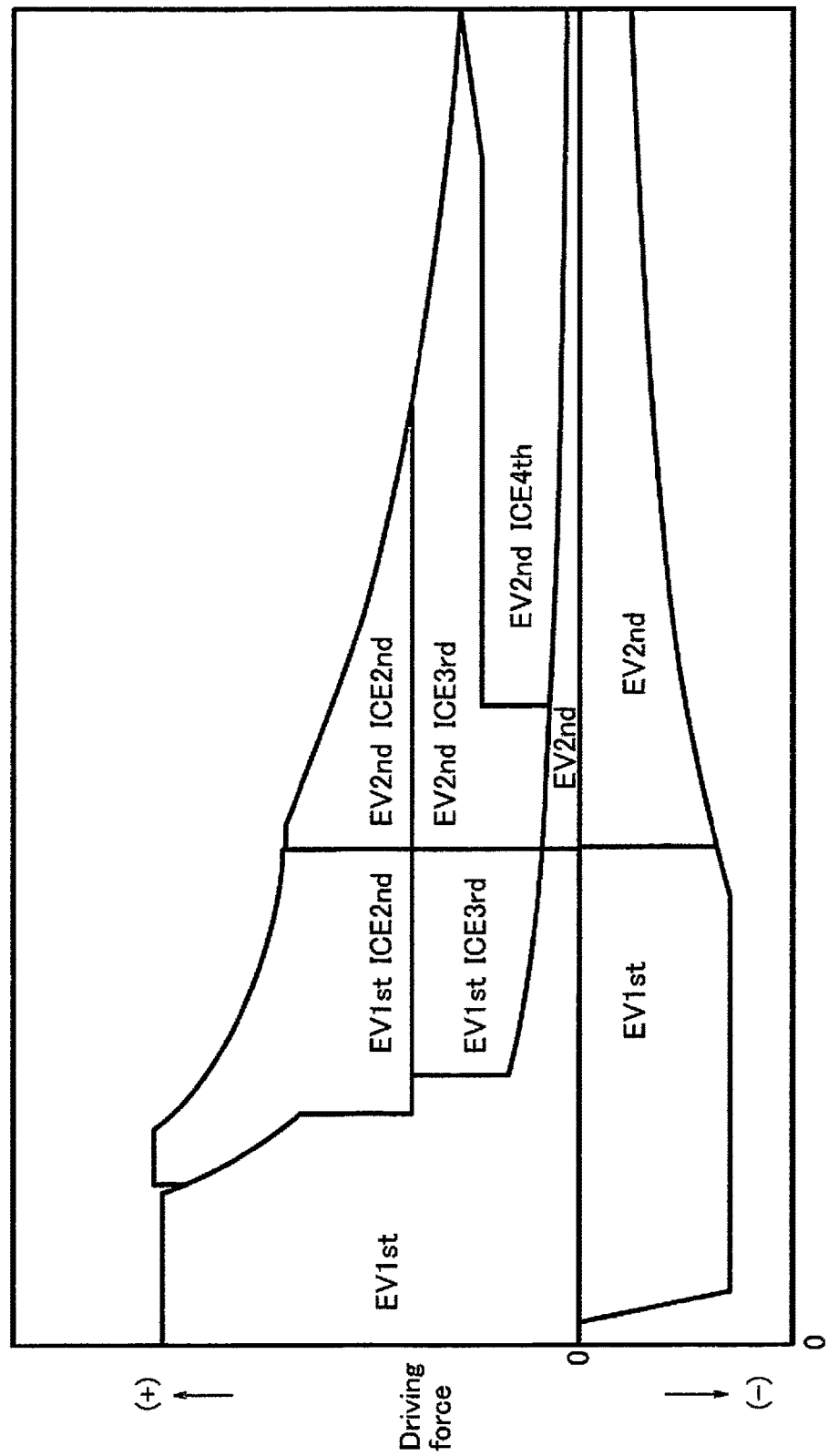
FIG. 5 is a first shift schedule map illustrating the switching region of the gear shift pattern that is selected during traveling when the battery SOC is in a region from a power generation end threshold to an upper limit value SOCmax.

The "first shift schedule map map1," illustrated in FIG. 5, has vehicle speed VSP and the required braking/driving force (Driving force) as the coordinate axes; selection regions in the coordinate plane of the figure are assigned for selecting from a plurality of gear shift patterns that constitute a normal use gear shift pattern group. That is, in the "first shift schedule map map1" a selection region of "EV 1st" is assigned to the low vehicle speed region after start, as a drive driving region by an accelerator pedal depression. Then, the selection regions "EV 2nd," "EV 1st ICE 2nd," "EV 1st ICE 3rd," "EV 2nd ICE 2nd," "EV 2nd ICE 3rd," and "EV 2nd ICE 4th" are assigned to the intermediate to high vehicle speed region. Regenerative braking regions for when coasting with the foot away from the accelerator pedal include the selection region "EV $1^{st}$," which is assigned to the low vehicle speed region, and the selection region "EV $2^{nd}$," which is assigned to the intermediate to high vehicle speed region.

Figure 6:
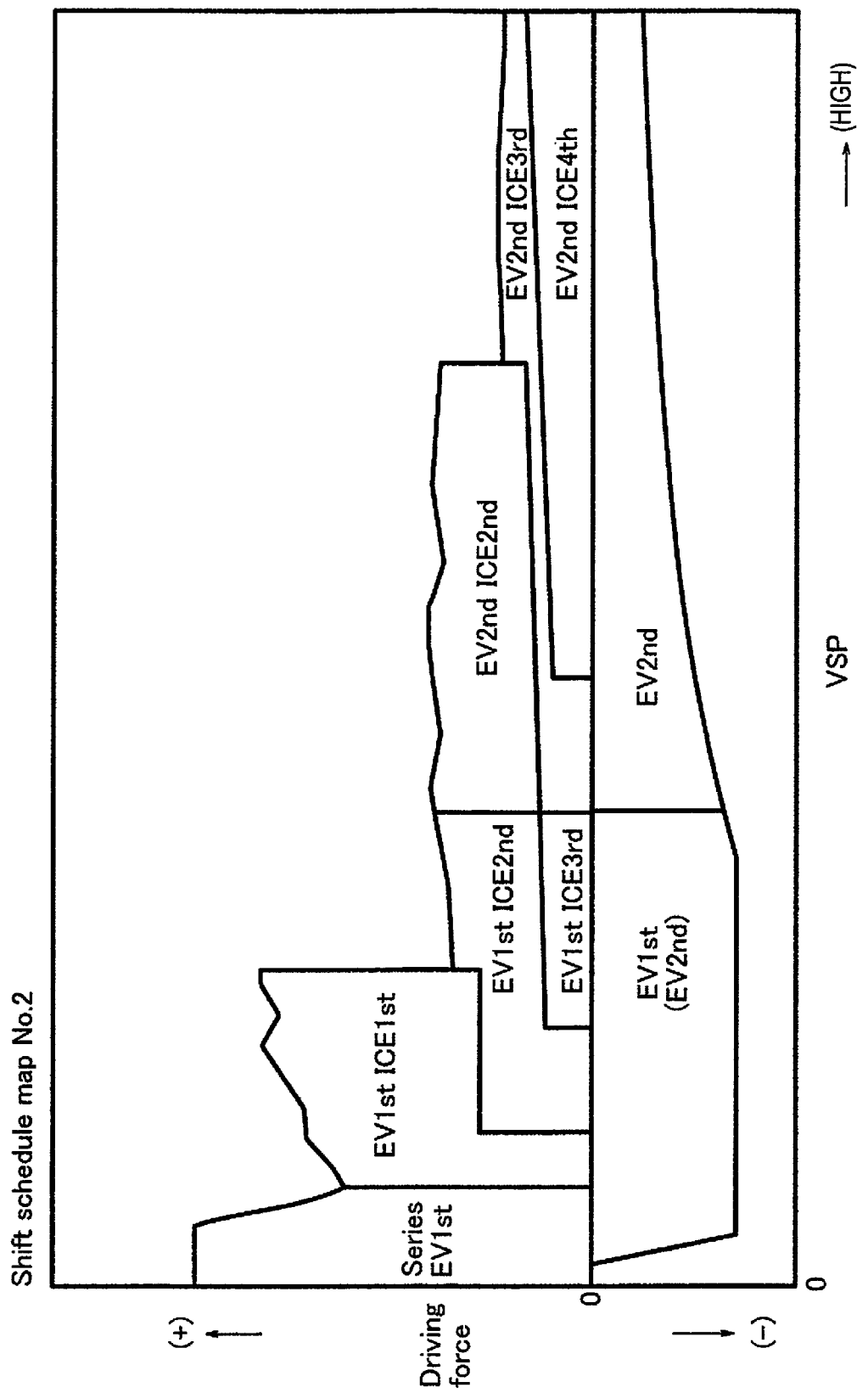
FIG. 6 is a second shift schedule map illustrating the switching region of the gear shift pattern that is selected during traveling when the battery SOC is in a region from zero to a power generation start threshold.

The "second shift schedule map map2," illustrated in FIG. 6, has vehicle speed VSP and required braking/driving force (Driving force) as the coordinate axes; selection regions in the coordinate plane of the figure are assigned for selecting from a plurality of gear shift patterns that constitute a normal use gear shift pattern group. In addition, compared with the "first schedule map map1," the "second schedule map map2" is a map in which "Series EV 1st" and "EV 1st ICE 1st" are added to the drive driving region in the coordinate plane, while "EV 2nd" is omitted, so as to suppress power consumption. That is, in the "second shift schedule map map2," a selection region of "Series EV 1st" is assigned to the start to low vehicle speed region as a drive driving region by an accelerator depression; in this "Series EV 1st" selection region, the mode cannot transition to the parallel HEV mode. Then, the selection regions of "EV 1st ICE 1st," "EV 1st ICE 2nd," and "EV 1st ICE 3rd" are assigned to the intermediate vehicle speed region, and the selection regions of "EV 2nd ICE 2nd," "EV 2nd ICE 3rd," and "EV 2nd ICE 4th" are assigned to the high vehicle speed region. Regenerative braking regions for when coasting with the foot away from the accelerator pedal include the selection region "EV 1st (EV 2nd)," which is assigned to the low vehicle speed region, and the selection region "EV 2nd," which is assigned to the high vehicle speed region.

Figure 7:
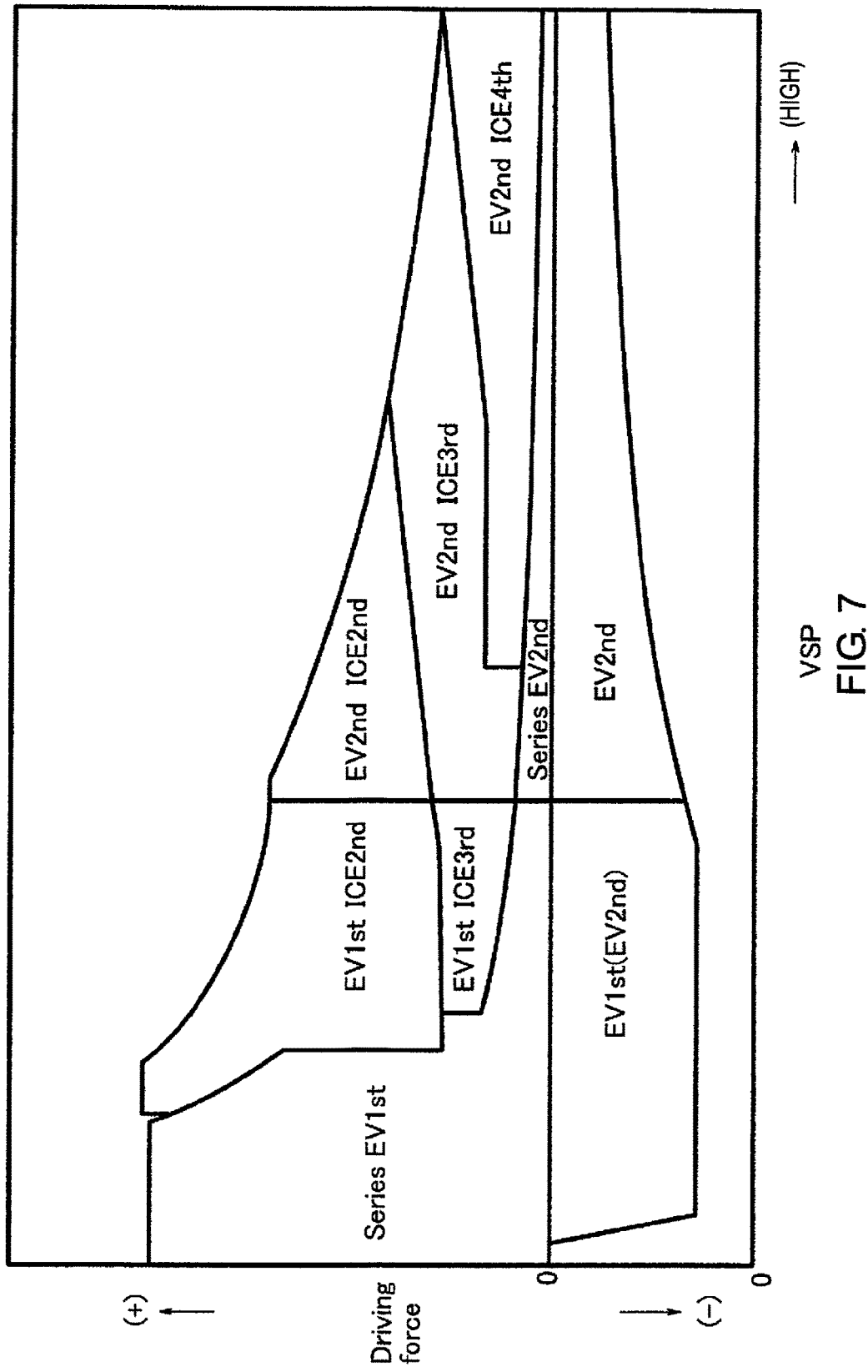
FIG. 7 is a third shift schedule map illustrating the switching region of the gear shift pattern that is selected during traveling when the battery SOC is in a region from the power generation start threshold to the power generation end threshold.

In the "third shift schedule map map3," illustrated in FIG. 7, the selection regions of "EV 1st" and "EV 2nd" in the EV mode are respectively assigned to "Series EV 1st" and "Series EV 2nd" in the drive driving region of the "first shift schedule map map1". That is, in the selection regions of "Series EV 1st" and "Series EV 2nd," EV traveling is carried out by the first motor/generator MG1 while electric power is generated in the second motor/generator MG2 by the internal combustion engine ICE, in order to suppress a reduction, and even to achieve an increase, in the battery SOC. In addition, in this "Series EV 1st" selection region in the "third shift schedule map map3," the mode cannot transition to the parallel HEV mode.

Configuration of the Power Generation Control Process

Figure 8:
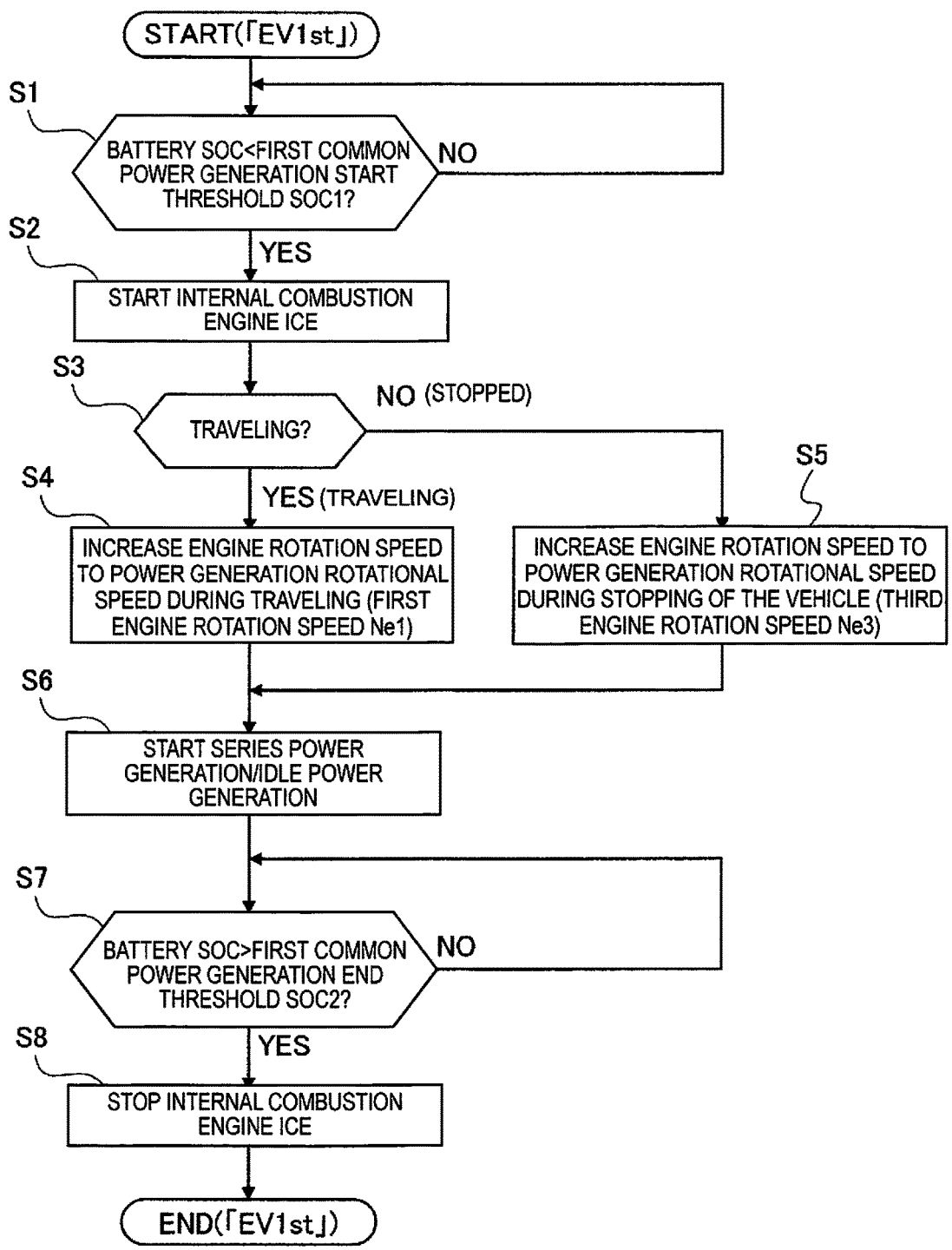
FIG. 8 is a flowchart illustrating the flow of the power generation control process that is executed in the hybrid control module of the first embodiment.

FIG. 8 illustrates a flow of the power generation control process that is executed in the hybrid control module 21 of the first embodiment (power generation controller). FIG. 9 is a diagram illustrating a case in which the power generation start threshold of the first embodiment is aligned with a first common power generation start threshold, which is an energy management map illustrating the battery SOC and the engine rotation speed in the first embodiment. FIG. 9 has the battery SOC and the engine rotation speed Ne (Engine Speed) as the coordinate axes, and the power generation start threshold, the power generation end threshold, and the engine rotation speed during each power generation are shown in the coordinate plane. Each of the steps in FIG. 8, which shows one example of the configuration of the power generation control process, are described below, as are the power generation start threshold, and the like, based on FIG. 9. The "EV 1st ICE-" gear shift pattern, in which the first engagement clutch C1 and the second engagement clutch C2 are both "N" and the third engagement clutch C3 is "Left," is referred to as "EV1st." In addition, if the "EV1st" gear shift pattern is selected, and EV travel is carried out by the first motor/generator MG1 while electric power is generated in the second motor/generator MG2 by the internal combustion engine ICE, this is hereinafter referred to as "Series EV 1st." This process is "START"ed when "EV1st" is selected.

In Step S1, it is determined whether or not the battery SOC (battery charge capacity) is below the first common power generation start threshold SOC1. In the case of YES (battery SOC<first common power generation start threshold SOC1), the process proceeds to Step S2, and if NO (battery SOC≥first common power generation start threshold SOC1), the process repeats Step S1. Here, "battery SOC" is the battery charge capacity of the high-power battery 3, and battery SOC information is acquired by a battery SOC sensor 78. In addition, "power generation start threshold" includes a series power generation start threshold (predetermined value SOC1) of the battery SOC for starting series power generation, and an idle power generation start threshold (predetermined value SOC3) of the battery SOC for starting idle power generation, as illustrated in FIG. 9. This "series power generation start threshold SOC1" does not use such a low battery SOC region as to adversely affect the service life of the high-power battery 3, and is set to a value that holds the battery SOC in a range in which it is not necessary to limit the motor output during travel. A "series power generation start threshold SOC1" set in this manner is also an optimal value of a threshold value at which to start series power generation from the standpoint of battery SOC management. In addition, the "idle power generation start threshold SOC3" is set to a battery SOC range in which the charging frequency of the high-power battery 3 becomes smaller than during series power generation, and is set to a value that holds the battery SOC in a range in which it is not necessary to limit the motor output during travel. In the first embodiment, the idle power generation start threshold SOC3 (chain double-dashed line in FIG. 9) is aligned with the series power generation start threshold SOC1 on the higher value side of the two threshold values, as indicated by arrow A in FIG. 9. Accordingly, the number of times of idle power generation is increased when aligning the idle power generation start threshold SOC3 with the series power generation start threshold SOC1, compared to when the idle power generation start threshold SOC3 is not aligned with the series power generation start threshold SOC1. The aligned power generation start threshold shall be the "first common power generation start threshold SOC1."

In Step S2, following the determination that "battery SOC<first common power generation start threshold SOC1" in Step S1, the internal combustion engine ICE is started and the process proceeds to Step S3.

In Step S3, following the "starting of the internal combustion engine ICE" in Step S2, it is determined whether or not the vehicle is traveling. In the case of YES (traveling), the process proceeds to Step S4, and if NO (stopped), the process proceeds to Step S5. Here, whether or not the vehicle is "traveling" is determined from a plurality of pieces of information, such as vehicle speed VSP information from the vehicle speed sensor 71.

In Step S4, following a "traveling" determination in Step S3, the engine rotation speed (internal combustion engine rotational speed, ICE rotational speed) Ne is increased to the power generation rotational speed during traveling, and the process proceeds to Step S6. That is, the engine rotation speed Ne is increased to a first engine rotation speed Ne1, in order to output an engine torque (internal combustion engine torque, ICE torque) corresponding to the power generation torque during traveling. The engine rotation speed of engine rotation speed Ne0 is zero.

In Step S5, following a "stopped" determination in Step S3, the engine rotation speed Ne is increased to the power generation rotational speed during stopping of the vehicle, and the process proceeds to Step S6. That is, the engine rotation speed Ne is increased to a third engine rotation speed Ne3, in order to output an engine torque corresponding to the power generation torque while the vehicle is stopped. Here, the third engine rotation speed Ne3 during idle power generation, when the idle power generation start threshold SOC3 is aligned with the series power generation start threshold SOC1, is set to be lower than a second engine rotation speed Ne2 (chain double-dashed line of FIG. 9) during idle power generation, when the idle power generation start threshold SOC3 is not aligned with the series power generation start threshold SOC1 (second engine rotation speed Ne2>third engine rotation speed Ne3), as indicated by arrow B in FIG. 9.

In Step S6, following an increase to the first engine rotation speed Ne1 in Step S4, or an increase to the third engine rotation speed Ne3 in Step S5, power generation with the second motor/generator MG2 is started by receiving driving force from the internal combustion engine ICE. That is, series power generation ("Series EV 1st") is started when the vehicle is traveling, and idle power generation (MG1 idle power generation, "EV1st") is started while the vehicle is stopped.

In Step S7, following the starting of power generation in Step S6, it is determined whether or not the battery SOC is above the first common power generation end threshold SOC2. In the case of YES (battery SOC>first common power generation end threshold SOC2), the process proceeds to Step S8, and if NO (battery SOC≤first common power generation end threshold SOC2), the process repeats Step S7. Here, "battery SOC" is as described above. In addition, in the first embodiment, the "power generation end threshold" includes a series power generation end threshold (predetermined value SOC2) of the battery SOC for ending series power generation, and an idle power generation end threshold of the battery SOC for ending idle power generation. In the first embodiment, the idle power generation end threshold is aligned with the series power generation end threshold SOC2. The aligned power generation end threshold shall be the "first common power generation end threshold SOC2." The idle power generation end threshold, when not aligned with the series power generation end threshold SOC2, is, for example, a value that is above the idle power generation start threshold SOC3 and smaller than the series power generation start threshold SOC1.

In Step S8, following the determination that "battery SOC>first common power generation end threshold SOC2" in Step S7, the internal combustion engine ICE is stopped and the process proceeds to END. Since power generation is ended at END, the gear shift pattern becomes "EV1st."

Next, the actions are described. The "action of the power generation control process" and the "characteristic action of the power generation control" will be described separately, regarding the actions of the power generation control device for a hybrid vehicle according to the first embodiment.

Action of the Power Generation Control Process

The "action of the power generation control process in series power generation" and the "action of the power generation control process in idle power generation" will be described separately, regarding the actions of the power generation control process, based on the flowchart illustrated in FIG. 8. In all of the control process actions, Step S1 is repeated in the flowchart of FIG. 8 until it is determined in Step S1 that the battery SOC is below the first common power generation start threshold SOC1. In addition, in all of the control process actions, the flow that progresses from Step S1 to Step S2 is the same, when it is determined that the battery SOC is below the first common power generation start threshold SOC1 Step S1.

Action of the Power Generation Control Process in Series Power Generation

Figure 10:
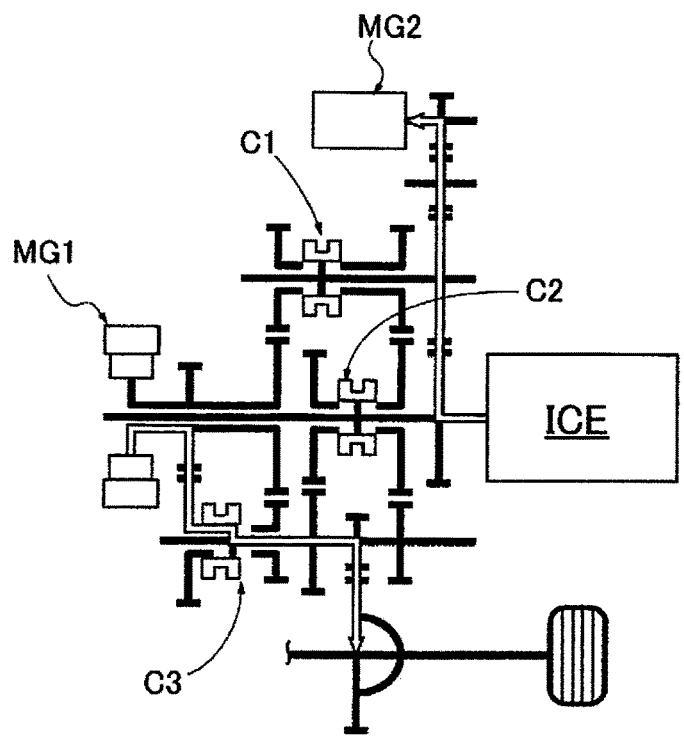
FIG. 10 is a torque flow diagram illustrating the transmission path of the ICE torque and the MG1 torque in the multistage gear transmission, when the "EV1st ICE-" gear shift pattern is selected during series power generation.

First, the action of the power generation control process in series power generation is described based on the flowchart of FIG. 8; then, the flow of the ICE torque and the MG1 torque during series power generation will be described based on the torque flow of FIG. 10.

When the battery SOC is below the first common power generation start threshold SOC1 and the internal combustion engine ICE is started, the process proceeds from START→Step S1→Step S2→Step S3 in the flowchart of FIG. 8. In Step S3, it is determined whether or not the vehicle is traveling. When it is determined that the vehicle is traveling in Step S3, the process proceeds from Step S3 to Step S4→Step S6→Step S7. In Step S4, the engine rotation speed is increased to the first engine rotation speed Ne1, which is the power generation rotational speed during traveling, and in Step S6, series power generation ("Series EV 1st") is started (executed). Next, in Step S7, it is determined whether or not the battery SOC is above the series power generation end threshold SOC2.

However, although the high-power battery 3 is charged by the second motor/generator MG2, which receives driving force from the internal combustion engine ICE, since the battery SOC does not increase to the first common power generation end threshold SOC2 for a little while after the start of series power generation, "battery SOC≤first common power generation end threshold SOC2" is determined in Step S7. As a result, Step S7 is repeated until "battery SOC>first common power generation end threshold SOC2" is determined in Step S7.

Then, when "battery SOC>first common power generation end threshold SOC2" is determined in Step S7, the process proceeds from Step S7 to Step S8→END. In Step S8, the internal combustion engine ICE is stopped. That is, the power generation control of series power generation is a flow that proceeds from START→Step S1→Step S2→Step S3→Step S4→Step S6→Step S7→Step S8→END in the flowchart of FIG. 8.

Next, the flow of the ICE torque and the MG1 torque in the multistage gear transmission when the "EV1st ICE-" gear shift pattern is selected during series power generation will be described based on FIG. 10.

In the "EV 1st ICE-" ("Series EV 1st") gear shift pattern, the first engagement clutch C1 is in the "N" position, the second engagement clutch C2 is in the "N" position, and the third engagement clutch C3 is in the "Left" position. Therefore, the MG1 torque flows from the first motor/generator MG1 to the second shaft 12→the fifth gear 105→the tenth gear 110→the third shaft 13→the seventh gear 107→the sixteenth gear 116→the differential gear 17→the drive shaft 18→the driving wheels 19. In addition, the ICE torque flows from the internal combustion engine ICE to the first shaft 11→first gear 101→eleventh gear 111→fourteenth gear 114→fifteenth gear 115→sixth shaft 16→second motor/generator MG2, and power generation is carried out by the second motor/generator MG2.

In this manner, in the series power generation, electric power is generated by the second motor/generator MG2 by receiving driving force from the internal combustion engine ICE, while traveling using the first motor/generator MG1 as the drive source.

Figure 11:
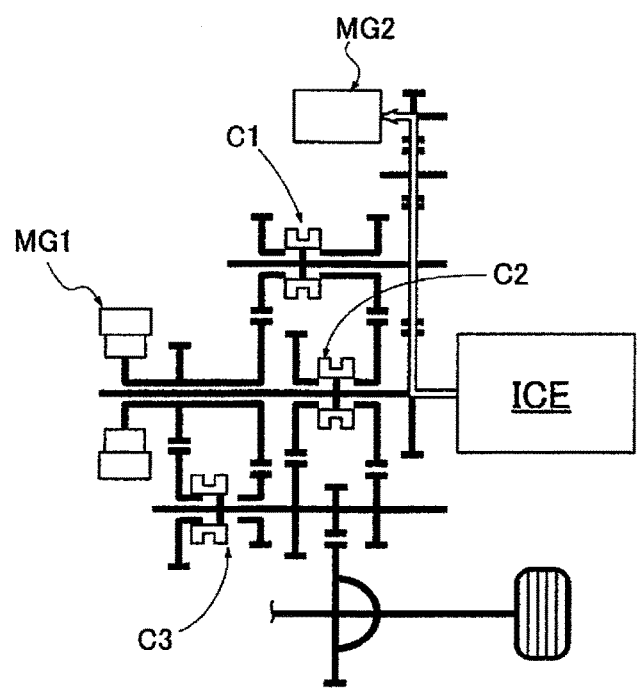
FIG. 11 is a torque flow diagram illustrating the transmission path of the ICE torque in the multistage gear transmission, when the "EV1st ICE-" gear shift pattern is selected during idle power generation.

Action of the Power Generation Control Process when Executing Idle Power Generation First, the action of the power generation control process when carrying out idle power generation is described based on the flowchart of FIG. 8; then, the flow of the ICE torque during idle power generation will be described based on the torque flow of FIG. 11. Here, since the flow that proceeds from Step S1 to Step S3 is the same as in the "Action of the power generation control process in series power generation," the description thereof will be omitted.

In Step S3, it is determined whether or not the vehicle is traveling. When it is determined that the vehicle is stopped in Step S3, the process proceeds from Step S3 to Step S5→Step S6→Step S7. In Step S5, the engine rotation speed is increased to the third engine rotation speed Ne3, which is the power generation rotational speed during stopping of the vehicle, and in Step S6, idle power generation ("EV1st") is started (executed). Next, in Step S7, it is determined whether or not the battery SOC is above the series power generation end threshold SOC2.

However, as stated in "Action of the power generation control process in series power generation," while the high-power battery 3 is charged by the second motor/generator MG2, which receives driving force from the internal combustion engine ICE, "battery SOC≤first common power generation end threshold SOC2" is determined in Step S7 and Step S7 is repeated for a little while after the start of idle power generation. In addition, since, during idle power generation, the engine rotation speed Ne is the third engine rotation speed Ne3, which is lower than the second engine rotation speed Ne2, the engine sound (sound of the internal combustion engine ICE) is less when power is generated at the third engine rotation speed Ne3 compared with when power is generated at the second engine rotation speed Ne2.

Then, when "battery SOC>first common power generation end threshold SOC2" is determined in Step S7, the process proceeds from Step S7 to Step S8→END. In Step S8, the internal combustion engine ICE is stopped. That is, the power generation control of idle power generation is a flow that proceeds from START→Step S1→Step S2→Step S3→Step S5→Step S6→Step S7→Step S8→END in the flowchart of FIG. 8.

Next, the flow of the ICE torque in the multistage gear transmission when the "EV1st ICE-" gear shift pattern is selected during idle power generation will be described based on FIG. 11.

In the "EV 1st ICE-" gear shift pattern, the first engagement clutch C1 is in the "N" position, the second engagement clutch C2 is in the "N" position, and the third engagement clutch C3 is in the "Left" position. Therefore, the ICE torque flows from the internal combustion engine ICE to the first shaft 11→first gear 101→eleventh gear 111→fourteenth gear 114→fifteenth gear 115→sixth shaft 16→second motor/generator MG2, and power generation is carried out by the second motor/generator MG2. In this manner, in the idle power generation, electric power is generated by the second motor/generator MG2 by receiving driving force from the internal combustion engine ICE, while the vehicle is stopped.

Characteristic Action of the Power Generation Control

For example, a conventional power generation control device for a hybrid vehicle that carries out series power generation during travel and idle power generation while the vehicle is stopped is used as a comparative example. According to the power generation control device for a hybrid vehicle of this comparative example, a battery SOC threshold, which is a threshold value for starting charging, is increased in the case of a driving state in which the traveling sound is loud. That is, a hybrid vehicle, which starts the engine with a decrease in the battery SOC to charge the battery by a generator, is configured to have two threshold values, a battery SOC threshold for starting the engine while the vehicle is stopped, and a battery SOC threshold during travel. The object is to thereby reduce discontent of the occupant with respect to noise.

However, the power generation control device for a hybrid vehicle of the comparative example has two threshold values: a battery SOC threshold while the vehicle is stopped and a battery SOC threshold during traveling. Consequently, there is the problem that, if the stopping and starting of the vehicle is repeated, control hunting occurs in which the engine repeats starting and stopping, which increases changes in the engine sound, and imparts discomfort to the occupant.

In contrast, the first embodiment is configured to set the series power generation start threshold SOC1 of the charge capacity of the battery, at which series power generation is started, and the idle power generation start threshold SOC3 of the charge capacity of the battery, at which idle power generation is started, to the same value (first common power generation start threshold SOC1) (Step S1 in FIG. 8, and FIG. 9). That is, by setting the series power generation start threshold SOC1 and the idle power generation start threshold SOC3 to the same value (first common power generation start threshold SOC1), stopping and starting of the internal combustion engine ICE is not repeated in a traveling scenario, in which stops and starts are repeated, such as when traveling in heavy traffic. Therefore, it is possible to prevent discomfort from being imparted to the occupant in a traveling scenario in which stops and starts are repeated.

In the first embodiment, when aligning the series power generation start threshold SOC1 and the idle power generation start threshold SOC3, the idle power generation start threshold SOC3 is aligned with the series power generation start threshold SOC1 on the higher value side of the two threshold values (Step S1 of FIG. 8, and FIG. 9). Then, the third engine rotation speed Ne3 during idle power generation, when the idle power generation start threshold SOC3 is aligned with the series power generation start threshold SOC1, is set to be lower than a second engine rotation speed Ne2 during idle power generation, when the idle power generation start threshold SOC3 is not aligned with the series power generation start threshold SOC1 (Step S5 in FIG. 8, and FIG. 9). For example, in order to secure sufficient generated electric power when the vehicle is stopped, it is necessary to increase the power generation frequency. That is, it is necessary to set the threshold value of the battery SOC for starting idle power generation high. If the threshold value is increased, the number of times of idle power generation (power generation frequency) increases, but the number of times that the engine is started also increases. Consequently, the occupant experiences discontent with respect to engine noise, due to the increased number of times that the engine is started.

In contrast, in the first embodiment, the idle power generation start threshold SOC3 is aligned with the series power generation start threshold SOC1 on the higher value side of the two threshold values (first common power generation start threshold SOC1). Then, when the idle power generation start threshold SOC3 is set to the first common power generation start threshold SOC1, the engine rotation speed Ne at the time of idle power generation is set to the third engine rotation speed Ne3, which is lower than the second engine rotation speed Ne2. That is, since the number of times of idle power generation (power generation frequency) while the vehicle is stopped is increased by aligning the idle power generation start threshold SOC3 with the series power generation start threshold SOC1 on the higher value side of the two threshold values, the number of times that the internal combustion engine ICE is started is increased. Then, although the number of times that the internal combustion engine ICE is started is increased, the third engine rotation speed Ne3, which is the engine rotation speed Ne at the time of idle power generation, is set lower than the second engine rotation speed Ne2. Accordingly, the sound of the internal combustion engine ICE caused by the third engine rotation speed Ne3 becomes lower than the sound of the internal combustion engine ICE caused by the second engine rotation speed Ne2. Therefore, when aligning the idle power generation start threshold SOC3 with the series power generation start threshold SOC1 on the higher value side of the two threshold values, the occupant is less likely to experience discontent with respect to the noise of the internal combustion engine ICE at the time of idle power generation. In addition, since the number of times of idle power generation while the vehicle is stopped is increased, it is possible to better secure the generated electric power at the time of idle power generation, compared to when aligning the series power generation start threshold SOC1 with the idle power generation start threshold SOC3.

The first embodiment is configured to execute series power generation by the series HEV mode, when in a low vehicle speed traveling scenario (FIG. 3, FIGS. 6-9). For example, in the parallel HEV mode, the engine rotation speed becomes a unique value that is determined from the vehicle speed and the gear ratio. Consequently, the engine rotation speed becomes a low rotational speed in a low vehicle speed traveling scenario, and it is not possible to secure a sufficient power generation amount. In addition, if the engine is operated at a low rotational speed, the engine rotation speed will match the natural vibration frequency of the drive system, so that there is the risk of the occurrence of low frequency noise, called muffled sounds. In contrast, the first embodiment is configured to execute series power generation by the series HEV mode, when in a low vehicle speed traveling scenario. That is, in the series HEV mode, the operating point (rotational speed, torque) of the internal combustion engine ICE can be freely determined regardless of the vehicle speed. Therefore, a sufficient power generation amount is secured and the generation of muffled sounds is prevented, when in a low vehicle speed traveling scenario. Additionally, when in a higher vehicle speed traveling scenario than the low vehicle speed range, it is possible to travel and generate power in the parallel HEV mode, with less energy conversion and better fuel efficiency.

The first embodiment is configured to execute series power generation by the series HEV mode, when in a limited traveling scenario in the low vehicle speed range, where the mode cannot transition to the parallel HEV mode (FIG. 3, FIGS. 6-9). Therefore, electric power is generated in the series HEV mode, even when in a limited traveling scenario in the low vehicle speed range, where the mode cannot transition to the parallel HEV mode.

Next, the effects are described. The effects listed below can be obtained by the power generation control device for a hybrid vehicle according to the first embodiment.

(1) In a hybrid vehicle comprising a first electric motor (first motor/generator MG1) that is mechanically coupled to drive wheels 19 and that is mainly used for travel driving, a second electric motor (second motor/generator MG2) that is mechanically coupled to the internal combustion engine ICE, and a battery (high-power battery 3) that is electrically coupled to the first electric motor (first motor/generator MG1) and the second electric motor (second motor/generator MG2), wherein a power generation controller (hybrid control module 21) is provided, which carries out series power generation, in which electric power is generated by the second electric motor (second motor/generator MG2) by receiving driving force from the internal combustion engine ICE while traveling by using the first electric motor (first motor/generator MG1) as the drive source, and idle power generation in which electric power is generated by at least one of the first electric motor (first motor/generator MG1) and the second electric motor (second motor/generator MG2) by receiving driving force from the internal combustion engine ICE while the vehicle is stopped, and the power generation controller (hybrid control module 21) sets a series power generation start threshold SOC1 of a charge capacity (battery SOC, SOC) of the battery (high-power battery 3), at which series power generation is started, and an idle power generation start threshold SOC3 of the charge capacity (battery SOC, SOC) of the battery (high-power battery 3), at which idle power generation is started, to the same value (first common power generation start threshold SOC1) (FIG. 8 and FIG. 9). Accordingly, it is possible to prevent discomfort from being imparted to the occupant in a traveling scenario, in which stops and starts are repeated.

(2) When aligning the series power generation start threshold SOC1 with the idle power generation start threshold SOC3, the power generation controller (hybrid control module 21) aligns the idle power generation start threshold SOC3 with the series power generation start threshold SOC1 on the higher value side of the two threshold values, and sets the internal combustion engine rotational speed (third engine rotation speed Ne3) during idle power generation, when the idle power generation start threshold SOC3 is aligned with the series power generation start threshold SOC1, to be lower than the internal combustion engine rotational speed (second engine rotation speed Ne2) during idle power generation, when the idle power generation start threshold SOC3 is not aligned with the series power generation start threshold SOC1 (FIG. 8 and FIG. 9). Accordingly, in addition to the effect of (1), when aligning the idle power generation start threshold SOC3 with the series power generation start threshold SOC1 on the higher value side of the two threshold values, the occupant is less likely to experience discontent with respect to the noise of the internal combustion engine ICE at the time of idle power generation.

(3) A system configuration in which a drive system from a power source (internal combustion engine ICE, first motor/generator MG1, second motor/generator MG2) to driving wheels 19 is provided with a power split mechanism (multistage gear transmission 1) that is capable of mode transition between a series HEV mode for carrying out series power generation, and a parallel HEV mode in which traveling is carried out using the first electric motor (first motor/generator MG1) and the internal combustion engine ICE as drive sources, wherein the power generation controller (hybrid control module 21) executes series power generation by the series HEV mode, when in a low vehicle speed traveling scenario (FIG. 3, FIGS. 6-9). Accordingly, in addition to the effect of (2), a sufficient power generation amount can be secured and the generation of muffled sounds can be prevented, when in a low vehicle speed traveling scenario.

(4) A system configuration in which the power split mechanism (multistage gear transmission 1) does not have a starting element that absorbs differential rotation, and, during starting, an EV start is carried out using the first electric motor (first motor/generator MG1) as the drive source, wherein the power generation controller (hybrid control module 21) executes series power generation with the series HEV mode, when in a limited traveling scenario in the low vehicle speed range, where the mode cannot transition to the parallel HEV mode (FIG. 3, FIGS. 6-9). Accordingly, in addition to the effect of (3), electric power is generated in the series HEV mode, even when in a limited traveling scenario in the low vehicle speed range, where the mode cannot transition to the parallel HEV mode.

Second Embodiment

The second embodiment is a modified example in which the series power generation start threshold SOC1 is aligned with the idle power generation start threshold SOC3. The configuration of the main parts of the second embodiment will be described below based on FIGS. 12 and 13.

The configuration is described first. Of the configurations of the power generation control device for a hybrid vehicle in the second embodiment, the "overall system configuration" and the "configuration of the shift control system" are the same as the first embodiment, and thus the descriptions thereof are omitted. The "configuration of the gear shift stages," and the "configuration of the power generation control process" of the second embodiment will be described below.

Configuration of the Gear Shift Stages

Since the descriptions based on FIGS. 3-4 are the same as the "Configuration of the gear shift stages" of the first embodiment, the descriptions thereof are omitted. Therefore, only the setting of three schedule maps will be described.

Figure 13:
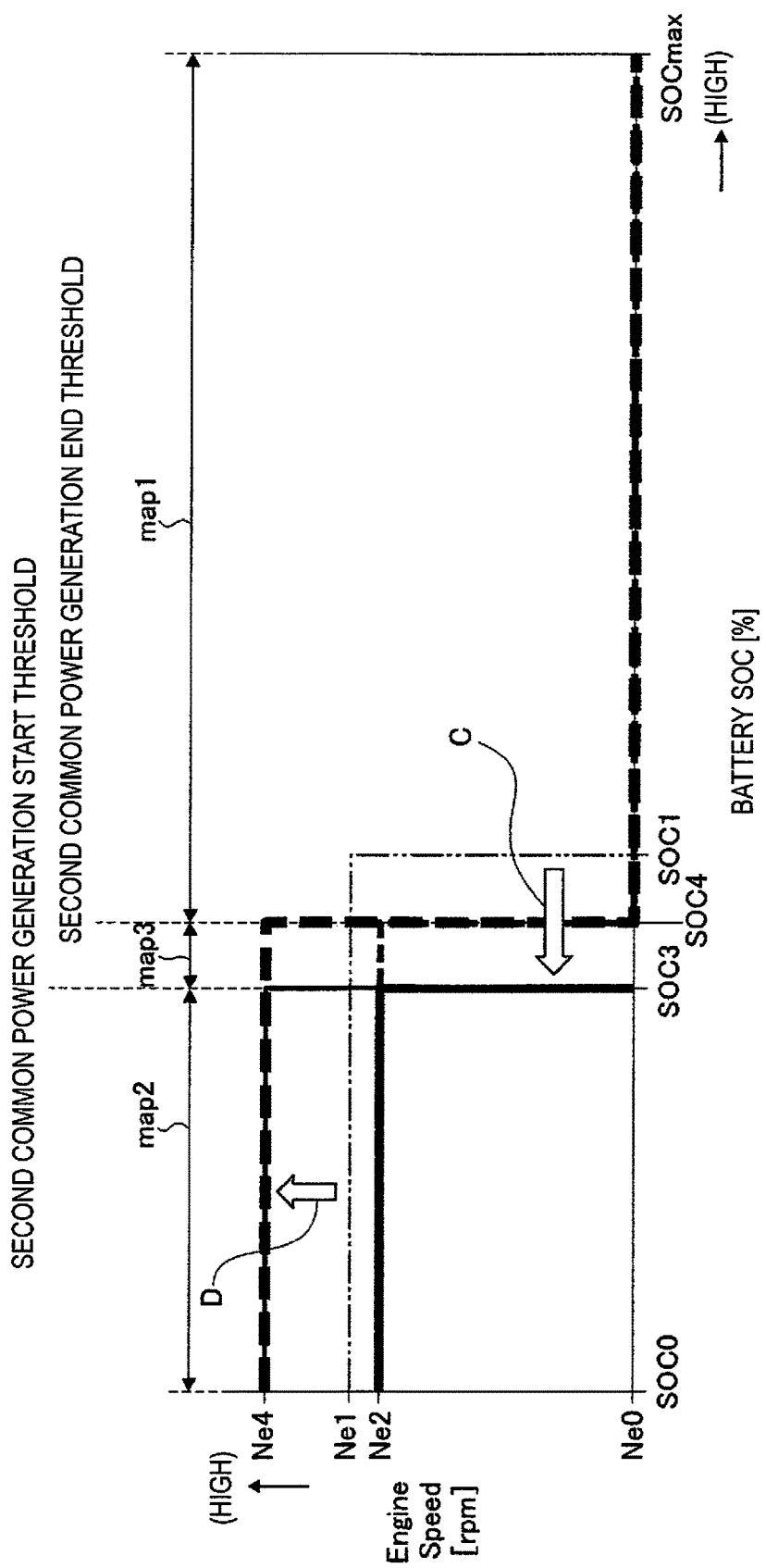
FIG. 13 is a diagram illustrating a case in which the power generation start threshold of the second embodiment is aligned with a second common power generation start threshold, and is an energy management map illustrating the battery SOC and the engine rotation speed in the second embodiment.

FIG. 13, explained in greater detail below, shows an energy management (energy management) map illustrating the battery SOC and the engine rotation speed of the second embodiment. As illustrated in this energy management map, regions for using the first schedule map map1 to third schedule map map3 are set according to the battery SOC.

That is, the first schedule map map1 is used in a middle to high SOC region (region shown as map1 in the figure), in which the battery SOC ranges from a predetermined value SOC4 (power generation end threshold, second common power generation end threshold) to an upper limit value SOCmax. In addition, the second schedule map map2 is used in a low SOC region (region shown as map2 in the figure), in which the battery SOC ranges from a predetermined value SOC0, which is zero, to a predetermined value SOC3 (power generation start threshold, second common power generation start threshold). Furthermore, the third schedule map map3 is used in a low to middle SOC region (region shown as map3 in the figure), in which the battery SOC ranges from the predetermined value SOC3 to the predetermined value SOC4. Since the specific configuration examples of the above-described first schedule map map1 to third schedule map map3 are the same as the descriptions based on FIG. 5-FIG. 7 of the first embodiment, the descriptions thereof will be omitted.

Configuration of the Power Generation Control Process

Figure 12:
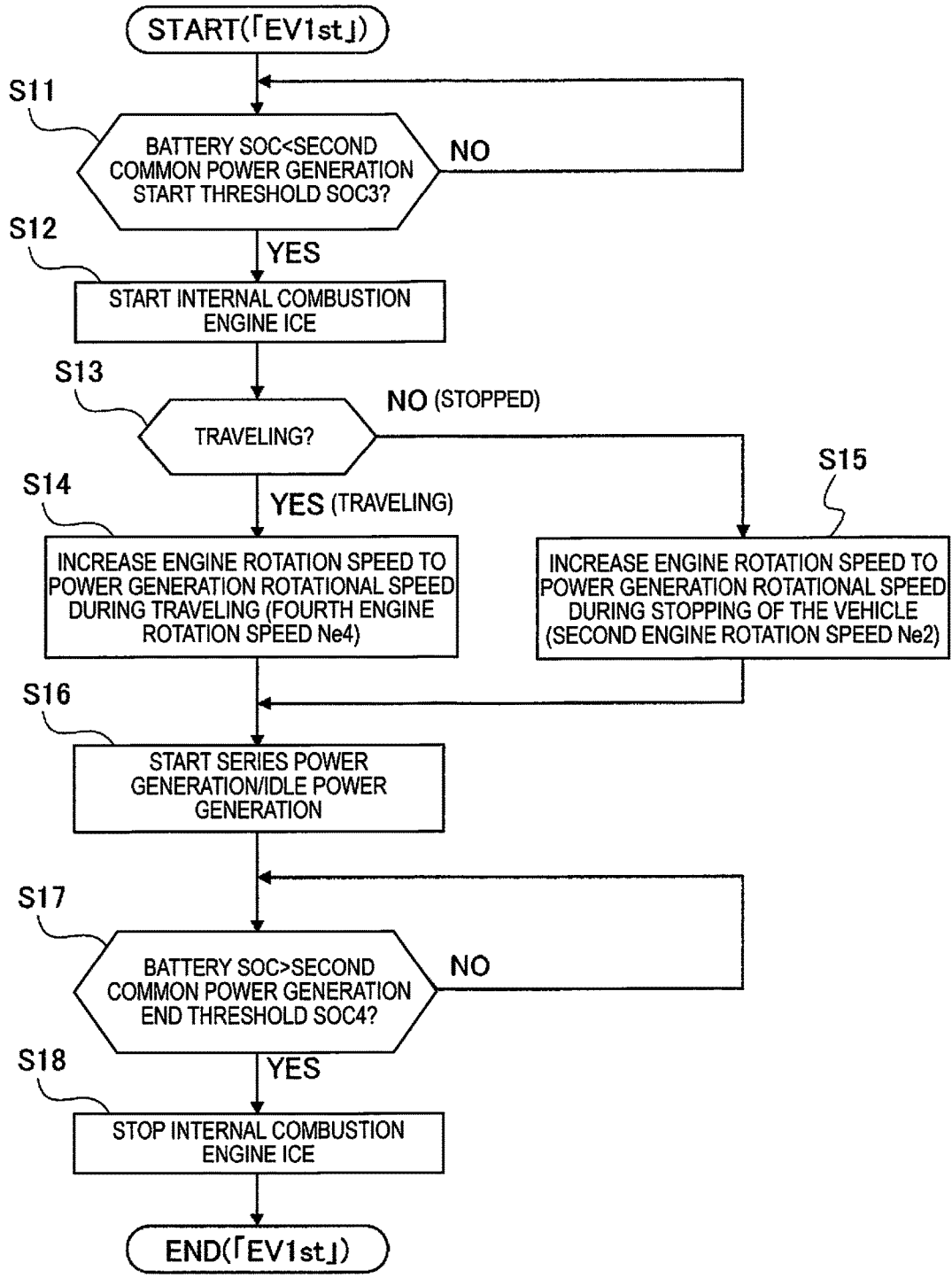
FIG. 12 is a flowchart illustrating the flow of the power generation control process that is executed in the hybrid control module of a second embodiment.

FIG. 12 illustrates a flow of the power generation control process that is executed in the hybrid control module 21 of the second embodiment (power generation controller). FIG. 13 is a view illustrating a case in which the power generation start threshold of the second embodiment is aligned with a second common power generation start threshold, which is an energy management map illustrating the battery SOC and the engine rotation speed of the second embodiment. This FIG. 13 has the battery SOC and the engine rotation speed Ne (Engine Speed) as the coordinate axes, and the power generation start threshold, the power generation end threshold, and the engine rotation speed during each power generation are shown on the coordinate plane. Each of the steps in FIG. 12, which shows one example of the configuration of the power generation control process, are described below, as are the power generation start threshold, and the like, based on FIG. 13. The "EV 1st ICE-" gear shift pattern, in which the first engagement clutch C1 and the second engagement clutch C2 are both "N" and the third engagement clutch C3 is "Left," is referred to as "EV1st." In addition, if the "EV1st" gear shift pattern is selected, and EV travel is carried out by the first motor/generator MG1 while electric power is generated in the second motor/generator MG2 by the internal combustion engine ICE, this is hereinafter referred to as "Series EV 1st." This process is "START"ed when "EV1st" is selected. Each of the steps of Step S12-Step S13 in FIG. 12 corresponds to each of the steps of Step S2-Step S3 in FIG. 8. Step S16 in FIG. 12 corresponds to Step S6 in FIG. 8, and Step S18 in FIG. 12 corresponds to Step S8 in FIG. 8. Therefore, only Step S11, Step S14, Step S15, and Step S17 in FIG. 12 will be described.

In Step S11, it is determined whether or not the battery SOC is below a second common power generation start threshold SOC3. In the case of YES (battery SOC<second common power generation start threshold SOC3), the process proceeds to Step S12, and if NO (battery SOC≥second common power generation start threshold SOC1), the process repeats Step S11. Here, the "power generation start threshold" includes an idle power generation start threshold (predetermined value SOC3) of the battery SOC for starting idle power generation, and a series power generation start threshold (predetermined value SOC1) of the battery SOC for starting series power generation, as illustrated in FIG. 13. In the second embodiment, the series power generation start threshold SOC1 (chain double-dashed line in FIG. 13) is aligned with the idle power generation start threshold SOC3 on the lower value side of the two threshold values, as indicated by arrow C in FIG. 13. Accordingly, the number of times of power generation for both idle power generation and series power generation is decreased when aligning the series power generation start threshold SOC1 with the idle power generation start threshold SOC3, compared to when the idle power generation start threshold SOC3 is aligned with the series power generation start threshold SOC1. The aligned power generation start threshold shall be the "second common power generation start threshold SOC3." The "battery SOC" and the respective setting of the "series power generation start threshold SOC1" and the "idle power generation start threshold SOC3" are the same as the description of Step S1; thus, the descriptions thereof are omitted.

In Step S14, following a "traveling" determination in Step S13, the engine rotation speed Ne is increased to the power generation rotational speed during traveling, and the process proceeds to Step S16. That is, the engine rotation speed Ne is increased to a fourth engine rotation speed Ne4, in order to output an engine torque corresponding to the power generation torque during traveling. Here, the fourth engine rotation speed Ne4 during series power generation, when the series power generation start threshold SOC1 is aligned with the idle power generation start threshold SOC3, is set to be greater than the first engine rotation speed Ne1 (chain double-dashed line of FIG. 13) during series power generation, when the series power generation start threshold SOC1 is not aligned with the idle power generation start threshold SOC3 (first engine rotation speed Ne1<fourth engine rotation speed Ne4), as indicated by arrow D in FIG. 13.

In Step S15, following a "stopped" determination in Step S13, the engine rotation speed Ne is increased to the power generation rotational speed during stopping of the vehicle, and the process proceeds to Step S16. That is, the engine rotation speed Ne is increased to a second engine rotation speed Ne2, in order to output an engine torque corresponding to the power generation torque while the vehicle is stopped.

In Step S17, following the starting of power generation in Step S16, it is determined whether or not the battery SOC is above the second common power generation end threshold SOC4. In the case of YES (battery SOC>second common power generation end threshold SOC4), the process proceeds to Step S18, and if NO (battery SOC≤second common power generation end threshold SOC4), the process repeats Step S17. Here, in the second embodiment, "power generation end threshold" includes an idle power generation end threshold (predetermined value SOC4) of the battery SOC for ending idle power generation, and a series power generation end threshold of the battery SOC for ending series power generation. In the second embodiment, the series power generation end threshold is aligned with the idle power generation end threshold SOC4. The aligned power generation end threshold shall be the "second common power generation end threshold SOC4." The series power generation end threshold, when not aligned with the idle power generation end threshold SOC4, is, for example, a value that is above the series power generation start threshold SOC1. Since "battery SOC" is the same as the description of Step S7, the description thereof is omitted.

Next, the actions are described. The "action of the power generation control process," and the "characteristic action of the power generation control" will be separately described, regarding the actions of the power generation control device for a hybrid vehicle according to the second embodiment.

The "action of the power generation control process in series power generation," and the "action of the power generation control process in idle power generation" will be described separately, regarding the actions of the power generation control process, based on the flowchart illustrated in FIG. 12. In all of the control process actions, Step S11 is repeated in the flowchart of FIG. 12 until it is determined in Step S11 that the battery SOC is below the second common power generation start threshold SOC3. In addition, in all of the control process actions, the flow that progresses from Step S11 to Step S12 is the same, when it is determined that the battery SOC is below the second common power generation start threshold SOC3 Step S11.

The action of the power generation control process in series power generation will now be described, based on the flowchart illustrated in FIG. 12. The power generation control of series power generation is a flow that proceeds from START→Step S11→Step S12→Step S13→Step S14→Step S16→Step S17→Step S18→END in the flowchart of FIG. 12. That is, when it is determined that the battery SOC is below the second common power generation start threshold SOC3 in Step S11, the process proceeds to Step S12; when the internal combustion engine ICE is started in Step S12, the process proceeds to Step S13; and in Step S13, it is determined whether or not the vehicle is traveling. If it is determined that the vehicle is traveling in Step S13, the process proceeds to Step S14, and when the engine rotation speed is increased to the fourth engine rotation speed Ne4, which is the power generation rotational speed during traveling, the process proceeds to Step S16. When series power generation ("Series EV 1st") is started (executed) in Step S16, the process proceeds to Step S17, and in Step S17, it is determined whether or not the battery SOC is above the second common power generation end threshold SOC4.

However, as described in Step S7 of the first embodiment, "battery SOC≤second common power generation end threshold SOC4" is determined in Step S17, and Step S17 is repeated for a little while. In addition, since, during series power generation, the engine rotation speed Ne is the fourth engine rotation speed Ne4, which is greater than the first engine rotation speed Ne1, engine torque corresponding to the power generation torque during traveling becomes greater when power is generated at the fourth engine rotation speed Ne4, compared with when power is generated at the first engine rotation speed Ne1. Accordingly, the power generation amount per unit time is greater when power is generated at the fourth engine rotation speed Ne4, compared with when power is generated at the first engine rotation speed Ne1, during series power generation. Accordingly, when aligning the series power generation start threshold SOC1 with the idle power generation start threshold SOC3 on the lower value side of the two threshold values, although the number of times of series power generation during traveling decreases, it is possible to secure the generated electric power during series power generation.

Then, when "battery SOC>second common power generation end threshold SOC4" is determined in Step S17, the process proceeds to Step S18, and when the internal combustion engine ICE is stopped in Step S18, the process proceeds to END. Since the flow of the ICE torque and the MG1 torque in the multistage gear transmission when the "EV1st ICE-" gear shift pattern is selected during series power generation is the same as the description based on FIG. 10 of the first embodiment, the description thereof is omitted.

The action of the power generation control process in idle power generation will be described, based on the flowchart illustrated in FIG. 12. The power generation control of idle power generation is a flow that proceeds from START→Step S11→Step S12→Step S13→Step S15→Step S16→Step S17→Step S18→END in the flowchart of FIG. 12. Since the flow that proceeds from Step S11 to Step S13 is the same as in the "Action of the power generation control process in series power generation," the description thereof will be omitted. That is, in Step S13, it is determined whether or not the vehicle is traveling. If it is determined that the vehicle is stopped in Step S13, the process proceeds to Step S15, and when the engine rotation speed is increased to the second engine rotation speed Ne2, which is the power generation rotational speed while the vehicle is stopped, the process proceeds to Step S16. When idle power generation ("EV1st") is started (executed) in Step S16, the process proceeds to Step S17, and in Step S17, it is determined whether or not the battery SOC is above the second common power generation end threshold SOC4.

However, as described in Step S7 of the first embodiment, "battery SOC≤second common power generation end threshold SOC4" is determined in Step S17, and Step S17 is repeated for a little while. In addition, since, during idle power generation, the engine rotation speed Ne is the second engine rotation speed Ne2, which is greater than the third engine rotation speed Ne3, the engine torque corresponding to the power generation torque while the vehicle is stopped becomes greater when power is generated at the second engine rotation speed Ne2, compared with when power is generated at the third engine rotation speed Ne3. Accordingly, the power generation amount per unit time is greater when generating power at the second engine rotation speed Ne2, compared with when generating power at the third engine rotation speed Ne3, during idle power generation. Accordingly, when aligning the series power generation start threshold SOC1 with the idle power generation start threshold SOC3 on the lower value side of the two threshold values, although the number of times of idle power generation decreases, it is possible to secure the generated electric power during idle power generation.

Since the flow that proceeds from Step S17 to END is the same as in the "Action of the power generation control process in series power generation," the description thereof will be omitted. Since the flow of the ICE torque in the multistage gear transmission when the "EV1st ICE-" gear shift pattern is selected during idle power generation is the same as the description based on FIG. 11 of the first embodiment, the description thereof is omitted.

Characteristic Action of the Power Generation Control

In the second embodiment, the series power generation start threshold SOC1 is set to the same value as the idle power generation start threshold SOC3, unlike in the first embodiment; however, the series power generation start threshold SOC1 and the idle power generation start threshold SOC3 are set to the same value (second common power generation start threshold SOC3), in the same manner as the first embodiment (Step S1 in FIG. 12, and FIG. 13). That is, by setting the series power generation start threshold SOC1 and the idle power generation start threshold SOC3 to the same value (second common power generation start threshold SOC3), stops and starts of the internal combustion engine ICE are not repeated in a traveling scenario, in which stops and starts are repeated, such as when traveling in heavy traffic. Therefore, it is possible to prevent discomfort from being imparted to the occupant in a traveling scenario, in which stops and starts are repeated.

In the second embodiment, when aligning the series power generation start threshold SOC1 and the idle power generation start threshold SOC3, the series power generation start threshold SOC1 is aligned with the idle power generation start threshold SOC3 on the lower value side of the two threshold values (Step S1 of FIG. 12, and FIG. 13). That is, since the number of times of idle power generation (power generation frequency) while the vehicle is stopped is decreased by aligning the series power generation start threshold SOC1 with the idle power generation start threshold SOC3 on the lower value side of the two threshold values, the number of times that the internal combustion engine ICE is started is decreased. Therefore, when aligning the series power generation start threshold SOC1 with the idle power generation start threshold SOC3 on the lower value side of the two threshold values, the occupant is less likely to experience discontent with respect to the noise of the internal combustion engine ICE at the time of idle power generation. In addition, since the number of times that the internal combustion engine ICE is started decreases, energy loss required for starting the internal combustion engine ICE decreases. Accordingly, it is possible to suppress deterioration of fuel consumption.

The second embodiment is configured to execute series power generation by the series HEV mode, when in a low vehicle speed traveling scenario, in the same manner as in the first embodiment (FIG. 3, FIGS. 6-7, and FIGS. 12-13). That is, in the series HEV mode, the operating point (rotational speed, torque) of the internal combustion engine ICE can be freely determined regardless of the vehicle speed. Therefore, a sufficient power generation amount is secured and the generation of muffled sounds is prevented, when in a low vehicle speed traveling scenario. Additionally, when in a traveling scenario with a vehicle speed that exceeds the low vehicle speed range, it is possible to travel and generate power in the parallel HEV mode, with less energy conversion and better fuel efficiency.

The second embodiment is configured to execute series power generation with the series HEV mode, when in a limited traveling scenario in the low vehicle speed range, where the mode cannot transition to the parallel HEV mode (FIG. 3, FIGS. 6-7, and FIGS. 12-13). Therefore, electric power is generated in the series HEV mode, even when in a limited traveling scenario in the low vehicle speed range, where the mode cannot transition to the parallel HEV mode.

Next, the effects are described. The effects listed below can be obtained, in addition to the effects of (1) and (3) to (4) of the first embodiment, by the power generation control device for a hybrid vehicle according to the second embodiment.

(5) When aligning the series power generation start threshold SOC1 and the idle power generation start threshold SOC3, the power generation controller (hybrid control module 21) aligns the series power generation start threshold SOC1 with the idle power generation start threshold SOC3 on the lower value side of the two threshold values (FIG. 12, and FIG. 13). Accordingly, in addition to the effect of (1), when aligning the series power generation start threshold SOC1 with the idle power generation start threshold SOC3 on the lower value side of the two threshold values, the occupant is less likely to experience discontent with respect to the noise of the internal combustion engine ICE at the time of idle power generation.

The power generation control device for a hybrid vehicle of the present invention was described above based on the first embodiment and the second embodiment, but specific configurations thereof are not limited to these embodiments, and various modifications and additions to the design can be made without departing from the scope of the invention according to each claim in the Claims.

In the first embodiment and the second embodiment, an example was shown in which the series power generation start threshold SOC1 and the idle power generation start threshold SOC3 are set to the same value. However, the "same value" may mean completely identical, but it is not necessary for the series power generation start threshold and the idle power generation start threshold to be completely identical, as long as the values are within are within the limits of the battery charge capacity, in which control hunting caused by stopping and starting of the internal combustion engine ICE does not become a problem. Accordingly, the series power generation start threshold SOC1 and the idle power generation start threshold SOC3 may vary within the limits of the battery charge capacity.

In the first embodiment, the idle power generation start threshold SOC3 is set to the same value as the series power generation start threshold SOC1, and in the second embodiment, the series power generation start threshold SOC1 is set to the same value as the idle power generation start threshold SOC3. However, it is not necessary to set the value to be the same as either one of the power generation start thresholds. For example, a numerical value between the series power generation start threshold SOC1 and the idle power generation start threshold SOC3 may be set as the common power generation start threshold, and the series power generation start threshold SOC1 and the idle power generation start threshold SOC3 may be set to the same value.

In the first embodiment and the second embodiment, an example was shown in which MG2 idle power generation is carried out in the "EV1st ICE-" gear shift pattern. However, the gear shift pattern may be switched from "EV1st ICE-" to "Neutral," and MG2 idle power generation may be carried out at the "Neutral" gear shift pattern.

In the first embodiment and the second embodiment, an example was shown in which the idle power generation is set to the MG2 idle power generation. However, the gear shift pattern may be switched, and the idle power generation may be set as MG1 idle power generation or double idle power generation.

In the first embodiment and the second embodiment, an example was shown in which the power split mechanism is the multistage gear transmission 1. However, the power split mechanism is not limited to the multistage gear transmission 1 and may be a planetary gear mechanism, or the like. In short, the power split mechanism may be any power split mechanism that is capable of mode transition between the series HEV mode and the parallel HEV mode.

In the first embodiment and the second embodiment, an example was shown in which the power split mechanism does not have a starting element that absorbs differential rotation. However, the power split mechanism may comprise a starting element.

In the first embodiment and the second embodiment, an example of a transmission controller was shown, in which the gear shift patterns, which exclude the interlock gear shift patterns and gear shift patterns that cannot be selected by the shift mechanism from all the gear shift patterns that can be obtained by engagement combinations of a plurality of engagement clutches C1, C2, C3, are considered the plurality of gear shift patterns that can be obtained by the multistage gear transmission 1. However, the transmission controller may be configured such that gear shift patterns, which exclude the interlock gear shift patterns from all the gear shift patterns that can be obtained by engagement combinations of a plurality of engagement clutches, are considered the plurality of gear shift patterns that can be obtained by the transmission. For example, if the shift mechanism is configured as a mechanism that causes each of the engagement clutches C1, C2, C3 to carry out a stroke operation independently, there will be no "gear shift patterns that cannot be selected by the shift mechanism." In this case, there will be more gear shift patterns that are used as gear shift patterns during malfunction.

In the first embodiment and the second embodiment, an example was shown in which the power generation control device of the present invention is applied to a hybrid vehicle that travels in the "parallel HEV mode" or the like, in which the engine driving force of the internal combustion engine ICE is assisted by the motor driving force. However, the internal combustion engine ICE may be used only for power generation. That is, the power generation control device for a hybrid vehicle of the present invention may be applied to a series hybrid vehicle as well.

In the second embodiment, an example was shown in which the engine rotation speed Ne is increased to a fourth engine rotation speed Ne4 in Step S14 of FIG. 12. However, in this Step S14, the engine rotation speed Ne may be set to the first engine rotation speed Ne1, in the same manner as Step S4 of FIG. 8 of the first embodiment.

The invention claimed is:

1. A power generation control device for a hybrid vehicle comprising a first electric motor that is mechanically coupled to a drive wheel and that is mainly used for travel driving, a second electric motor that is mechanically coupled to an internal combustion engine, and a battery that is electrically coupled to the first electric motor and the second electric motor, the power generation control device comprising:
    a power generation controller that carries out series power generation in which electric power is generated by the second electric motor by receiving driving force from the internal combustion engine while traveling by using the first electric motor as a drive source, and that carries out idle power generation in which electric power is generated by at least one of the first electric motor and the second electric motor by receiving driving force from the internal combustion engine while the vehicle is stopped, and
    the power generation controller sets a series power generation start threshold of a charge capacity of the battery at which the series power generation is started and an idle power generation start threshold of the charge capacity of the battery at which the idle power generation is started to the same value, and the same value is a value that maintains the charge capacity of the battery within a range in which it is not necessary to limit the output of the first electric motor during traveling.

2. The power generation control device as recited in claim 1, wherein
    the power generation controller makes an internal combustion engine rotational speed during generating power by the idle power generation to be lower than the internal combustion engine rotational speed during generating power by the series power generation, and
    when the series power generation start threshold is made the same value as the idle power generation start threshold, the power generation controller makes the idle power generation start threshold the same value as the series power generation start threshold on a higher value side of the two threshold values, and sets the internal combustion engine rotational speed during the idle power generation when the idle power generation start threshold is made the same value as the series power generation start threshold to be lower than the internal combustion engine rotational speed during the idle power generation when the idle power generation start threshold is not made the same value as the series power generation start threshold.

3. The power generation control device as recited in claim 1, wherein
    when the series power generation start threshold is made the same value as the idle power generation start threshold, the power generation controller makes the series power generation start threshold with the idle power generation start threshold on a lower value side of the two threshold values.

4. The power generation control device as recited in claim 3, wherein
    a system configuration of a drive system having a drive from a power source to the driving wheel is provided with a power split mechanism that is capable of mode transition between a series HEV mode for carrying out the series power generation, and a parallel HEV mode in which traveling is carried out using the first electric motor and the internal combustion engine as drive sources, and
    the power generation controller executes the series power generation with the series HEV mode when in a first vehicle speed traveling scenario in a starting region when the series HEV mode cannot transition to the parallel HEV mode, and the charge capacity of the battery is below the power generation start threshold such that the series power generation start threshold and the idle power generation start threshold are made the same value.

5. The power generation control device as recited in claim 4, wherein
    the system configuration having the power split mechanism does not have a starting element that absorbs differential rotation, and an EV start is carried out using the first electric motor as the drive source during starting, and
    the power generation controller executes the series power generation with the series HEV mode when in a limited traveling scenario in a first vehicle speed range, wherein the series HEV mode is allocated on a map indicating a switching region of the gear shift pattern that is selected during traveling and the series HEV mode cannot transition to the parallel HEV mode on the map, and the charge capacity of the battery is below the power generation start threshold such that the series power generation start threshold and the idle power generation start threshold are made the same value.

6. The power generation control device as recited in claim 2, wherein
    a system configuration of a drive system having a drive from a power source to the driving wheel is provided with a power split mechanism that is capable of mode transition between a series HEV mode for carrying out the series power generation, and a parallel HEV mode in which traveling is carried out using the first electric motor and the internal combustion engine as drive sources, and
    the power generation controller executes the series power generation with the series HEV mode when in a first vehicle speed traveling scenario in a starting region when the series HEV mode cannot transition to the parallel HEV mode, and the charge capacity of the battery is below the power generation start threshold such that the series power generation start threshold and the idle power generation start threshold are made the same value.

7. The power generation control device as recited in claim 6, wherein
    the system configuration having the power split mechanism does not have a starting element that absorbs differential rotation, and an EV start is carried out using the first electric motor as the drive source during starting, and the power generation controller executes the series power generation with the series HEV mode when in a limited traveling scenario in a first vehicle speed range, wherein the series HEV mode is allocated on a map indicating a switching region of the gear shift pattern that is selected during traveling and the series HEV mode cannot transition to the parallel HEV mode on the map, and the charge capacity of the battery is below the power generation start threshold such that the series power generation start threshold and the idle power generation start threshold are made the same value.

* * * * *